United States Patent
Kaseda et al.

(10) Patent No.: US 11,113,900 B2
(45) Date of Patent: Sep. 7, 2021

(54) IMAGE PROCESSING DEVICE, NUMBER-OF-AXLES DETECTION SYSTEM, TOLL SETTING DEVICE, TOLL SETTING SYSTEM, AND NON-TRANSITORY COMPUTER-READABLE MEDIUM STORING PROGRAM

(71) Applicant: KONICA MINOLTA, INC., Tokyo (JP)

(72) Inventors: Takumi Kaseda, Tokyo (JP); Asahi Ebe, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 92 days.

(21) Appl. No.: 16/553,613

(22) Filed: Aug. 28, 2019

(65) Prior Publication Data
US 2020/0074754 A1 Mar. 5, 2020

(30) Foreign Application Priority Data
Aug. 31, 2018 (JP) .............................. JP2018-163491

(51) Int. Cl.
| G07B 15/06 | (2011.01) |
| G06K 9/00 | (2006.01) |
| G06T 7/73 | (2017.01) |
| G06T 3/40 | (2006.01) |
| G06T 7/62 | (2017.01) |

(52) U.S. Cl.
CPC ......... *G07B 15/06* (2013.01); *G06K 9/00785* (2013.01); *G06T 3/4038* (2013.01); *G06T 7/62* (2017.01); *G06T 7/74* (2017.01); *G06T 2207/30236* (2013.01); *G06T 2207/30242* (2013.01); *G06T 2207/30252* (2013.01)

(58) Field of Classification Search
CPC ... G06T 7/10; G06T 7/11; G06T 7/174; G06T 7/60; G06T 7/70; G06T 7/73; G06T 7/74; G06T 2207/30236; G06T 2207/30242; G06T 2207/30252; G06K 9/00785; G06K 2209/23; G07B 15/06
See application file for complete search history.

(56) References Cited

U.S. PATENT DOCUMENTS

| 2017/0277952 A1* | 9/2017 | Thommes et al. ..... G08G 1/056 |
| 2017/0330454 A1* | 11/2017 | Backvall et al. .. G06K 9/00771 |
| 2020/0013280 A1* | 1/2020 | Micoski et al. ....... G08G 1/015 |
| 2020/0202555 A1* | 6/2020 | Noda et al. ........ G06K 9/00335 |

FOREIGN PATENT DOCUMENTS

| JP | 2016191993 A | 11/2016 |
| JP | 2017182742 A | 10/2017 |

* cited by examiner

*Primary Examiner* — Andrew W Johns
(74) *Attorney, Agent, or Firm* — Cantor Colburn LLP

(57) ABSTRACT

Disclosed is an image processing device including a hardware processor that: specifies a position of a plurality of tires of a moving vehicle from a captured image showing at least the plurality of tires of the vehicle; makes a determination of whether or not each of the plurality of tires is in contact with a ground on the basis of a position of the specified plurality of tires; and counts the number of axle of a tire in contact with the ground of the vehicle according to a result of the determination.

30 Claims, 14 Drawing Sheets

IMAGE PROCESSING DEVICE, NUMBER-OF-AXLES DETECTION SYSTEM, TOLL SETTING DEVICE, TOLL SETTING SYSTEM, AND NON-TRANSITORY COMPUTER-READABLE MEDIUM STORING PROGRAM

CROSS-REFERENCE TO RELATED APPLICATION

The present application claims priority under 35 U.S.C. § 119 to Japanese Patent Application No. 2018-163491, filed on Aug. 31, 2018, the content of which are all incorporated herein by reference.

BACKGROUND

Technical Field

The present invention relates to an image processing device, a number-of-axles detection system, a toll setting device, a toll setting system, and a non-transitory computer-readable medium storing a program.

Description of the Related Art

Heavy-duty vehicles with a large load capacity such as trucks often have more tires and axles than those of small or light-duty vehicles. Toll roads such as expressways may adopt road pricing or tolling schemes for collecting tolls according to the number of axles of tires that are in contact with the ground.

According to an existing technology, the number of axles is detected by detecting passage of tires by a pressure sensor provided on a plate installed on the road (see JP 2017-182742A). Since such a sensor that directly detects travel of a vehicle is embedded in the road surface, time and labor are needed for maintenance, and also involves the problem that the travel route needs to be closed during the maintenance.

As another existing technology, JP 2016-191993A discloses a scheme for determination of the number of axles through determining distances to a vehicle using a laser beam and detecting the number of points of contact of tires with the ground on the basis of the distribution of the distances.

However, heavy-duty vehicles loading a cargo such as trucks may be capable of traveling with some of their tires disengaged from the ground by raising some of their tires (lifting axle technology) according to presence or absence of a cargo or actual load quantity. As a problem that needs to be addressed, laser distance measurement techniques may have difficulty in appropriately counting the number of axles of the tires depending on various conditions.

SUMMARY

An object of the present invention is to provide an image processing device, a number-of-axles detection system, a toll setting device, a toll setting system, and a non-transitory computer-readable medium storing a program which are capable of counting the number of axles taking into account presence or absence of contact of tires with the ground more readily and appropriately.

In order to achieve at least one of the above-identified objects, an embodiment according to an aspect of the present invention is directed to an image processing device including a hardware processor that: specifies a position of a plurality of tires of a moving vehicle from a captured image showing at least the plurality of tires of the vehicle; makes a determination of whether or not each of the plurality of tires is in contact with a ground on the basis of a position of the specified plurality of tires; and counts the number of axle of a tire in contact with the ground of the vehicle according to a result of the determination.

Also, another embodiment according to another aspect of the present invention is directed to a non-transitory computer-readable medium storing a program that causes a computer to: specify a position of a plurality of tires of a moving vehicle from a captured image showing at least the plurality of tires; make a determination of whether or not each tire is in contact with a ground on the basis of a position of the plurality of tires specified by the specifier; and count the number of axle of a tire in contact with the ground of the vehicle according to a result of the determination.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, in which.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
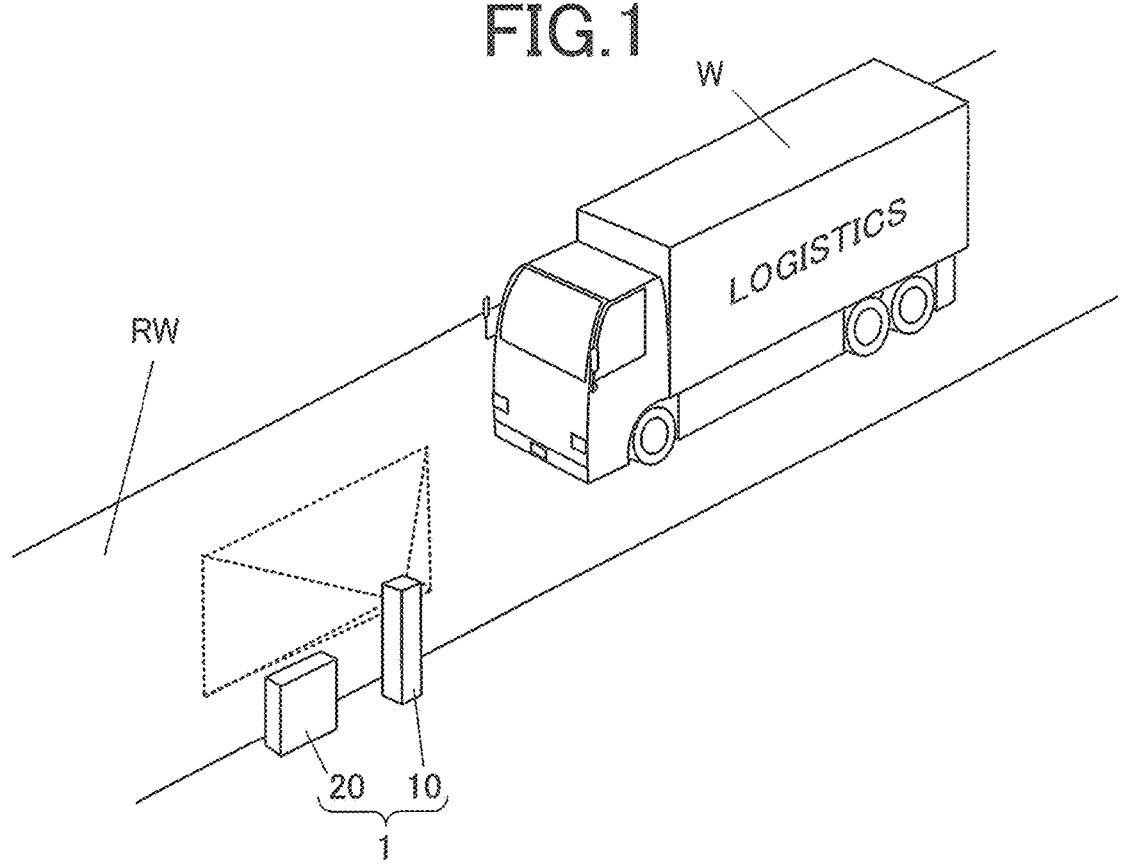
FIG. 1 is an overall view illustrating a number-of-axles detection system of this embodiment.

FIG. 1 is an overall view illustrating a number-of-axles detection system 1 (which corresponds to a "toll setting system") of this embodiment.

The number-of-axles detection system 1 includes an imaging device 10 and a processing device 20 (which corresponds to an image processing device and a toll setting device).

The imaging device 10 captures an image of a vehicle traveling on a travel route RW and outputs capture data. The processing device 20 acquires the captured data from the imaging device 10, subjects the acquired captured data to image processing, and performs detection of a tire and determination of whether or not the tire is in contact with the ground. The imaging device 10 is, by way of example and not limitation, provided at a fixed location and with a fixed orientation near an entrance or exit lane of a toll road such as an expressway and continuously performs capturing of images of vehicles entering the toll road. The imaging device 10 may be a video imaging device that captures moving images or may be an imaging device (camera) that continuously captures still images at predetermined intervals. The frame rates of the moving images, the predetermined time intervals, etc. may be defined such that at least two images (e.g., three to six images) of each vehicle crossing a predetermined area defined by a predetermined angle of view are allowed to be obtained, and may be modified according to a location of installation of the imaging device 10, or according to an expected traveling speed of a vehicle within the area defined by the angle of view. Here, for simplicity, the imaging range of the imaging device 10 is defined in a shape of a rectangle whose width corresponds to the horizontal direction and whose height corresponds to the vertical direction (height direction). Also, it suffices here that at least tires of a vehicle be always included in the imaging range (as defined according to the angle of view) and, for example, a part of the upper-end side of the vehicle with respect to the height direction may not appear in the imaging range.

Figure 2:
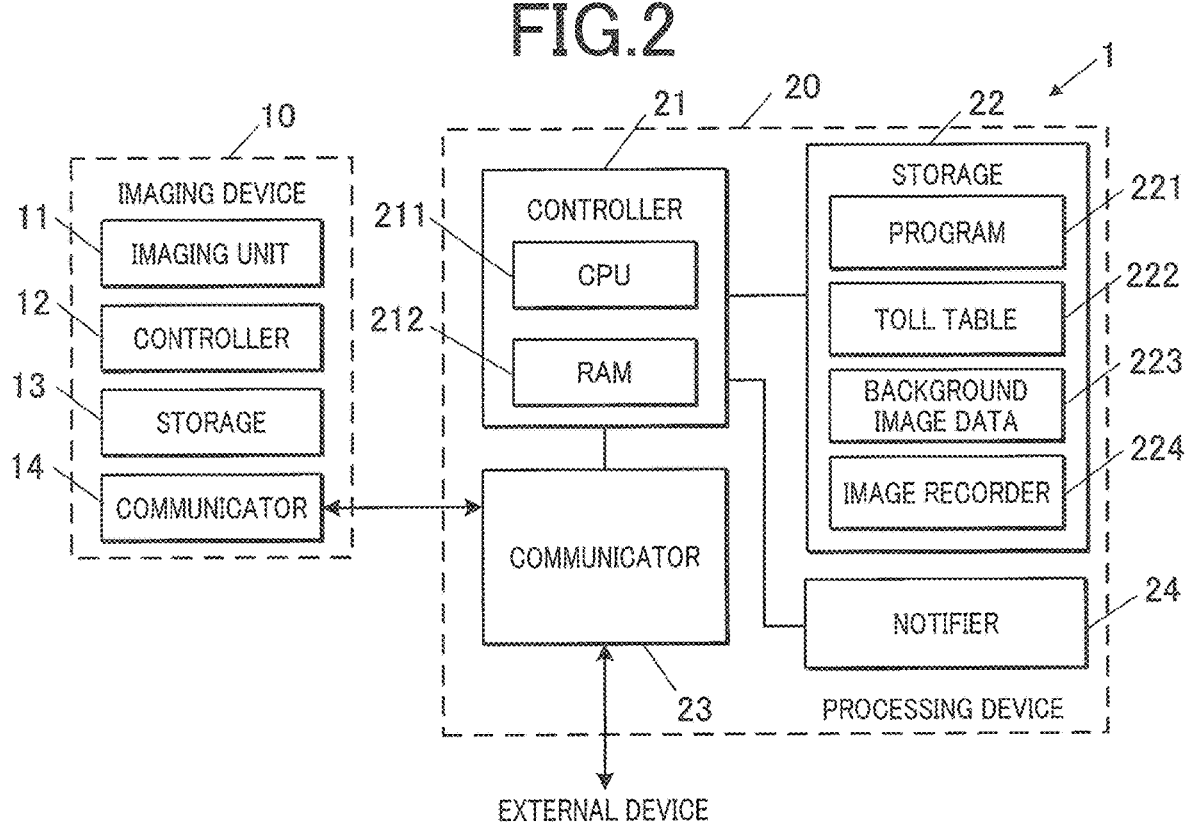
FIG. 2 is a block diagram illustrating a functional configuration of the number-of-axles detection system.

FIG. 2 is a block diagram that illustrates a functional configuration of the number-of-axles detection system 1.

The imaging device 10 may include an imaging unit 11, a controller 12, a storage 13, a communicator 14, and the like.

The imaging unit 11 may include an optical device that guides visible light incident from the outside to each pixel position and a detector that detects an amount of incident light for each of the red, green, and blue (RGB) light beams at each pixel position. The detector acquires, here, two-dimensional image data captured by imaging elements two-dimensionally arranged on a plane such that the pixel values (e.g., quantities of light (luminance values) of red, green, and blue light beams according to an RGB color model) at the respective pixel positions can be acquired. The image data obtained by the operation of the imaging unit 11 is output to the storage 13. The controller 12 outputs the image data temporarily stored in the storage 13 to the processing device 20 via the communicator 14 at an appropriate time point.

The processing device 20, which is a computer that performs arithmetic processing, includes a controller 21, a storage 22, a communicator 23, a notifier 24, and the like.

The controller 21 is a hardware processor that comprehensively controls the operation of the processing device 20. The controller 21 may include a central processing unit (CPU) 211 that performs various arithmetic processes and a random access memory (RAM) 212 that provides a memory space for the operations of the CPU 211 and stores data temporarily. The controller 21 processes and analyzes the captured image acquired from the imaging device 10 to specify the entire range of each vehicle and acquires the number of axles, in the identified vehicle, of tires in contact with the ground. Also, the controller 21 sets the toll for entry (fare for traveling) to enter an express way (a predetermined section of entry) on the basis of the acquired number of axles and outputs information thereof.

The storage 22 may store various programs, configuration data, configuration data, image data, results of analysis thereof, etc. The storage 22 may be configured by non-volatile memory such as flash memory enabling reads, writes, and updates, a hard disk drive (HDD), etc. Also, the program 221, the initial setting data, etc. may be stored in mask ROM (read only memory) or the like.

The program 221 may include programs associated with panoramic photograph generation processing, number-of-axles determination processing, and toll setting processing which will be described later. The CPU 211 of the controller 21 reads from the storage 22 the program 221 and the configuration data to store them in the RAM 212 and runs the program 221. The configuration data may include a toll table 222, a background image data 223, and an image recorder 224, etc.

The toll table 222 stores, in the form of a list, the tolls for entry of the vehicles to enter the express way according to the numbers of axles of the tires extracted from the image data by the processing device 20.

The background image data 223 is an image that is captured in a state where no vehicle travels in the imaging range of the imaging device 10. The background image data 223 is acquired and updated at appropriate intervals, for example, intervals that ensure that the amount of incident light and shadows do not change beyond a predetermined criterion. Alternatively, multiple images according to seasons, hours in a day, weather conditions, etc. may be held in advance and used for multiple times appropriately in a selectable manner.

The image recorder 224 records (stores) the image data captured by the imaging device 10. The pieces of image data may be capable of being overwritten starting from the oldest one and updated within a predetermined capacity. Alternatively, pieces of data existing for a predetermined period of time may be periodically erased from the image recorder 224 and new pieces of data may be recorded (stored) in the empty area. The predetermined capacity is defined such that it is possible to retain a piece of image data of a sufficiently long period of time relative to the processing time of each frame of the captured moving image data and, even when older data is erased, no problem arises regarding the decoding of the subsequent pieces of frame data according to the encoding scheme of the moving image.

The communicator 23 implements control necessary for communications with external devices. The communicator 23 is, for example, a network card and receives the image data from the imaging device 10 and outputs a signal in accordance with the result of analysis of the image data by the controller 21 to the external device(s). Examples of the external devices as the destinations of the output may include a toll collection device that performs various operations associated with charging and acceptance of the tolls set on the basis of the number of axles and vehicle size, a control device that controls the operation of a gate that blocks passage of a vehicle that does not pay the toll, and a monitoring device operated by an attendant who monitors the operation status of the number-of-axles detection system 1.

The notifier 24 performs a predetermined notification action to the user or monitoring personnel of the attendant of the processing device 20 on the basis of the control implemented by the controller 21. Examples of the notification action executed by the notifier 24 may include a display action on a predetermined display screen, an action of emitting beeps, and the like, or combinations thereof.

Next, the number-of-axles specification operation by the processing device 20 will be described.

The processing device 20 first specifies the entire range of each vehicle from multiple pieces of image data captured from one side of the vehicle. The processing device 20 specifies the tires within the specified entire range and distinguishes those in contact with the ground from the other ones of the specified tires, and finally specifies the number of the tires in contact with the ground, in other words, the number of axles.

Figure 3A:
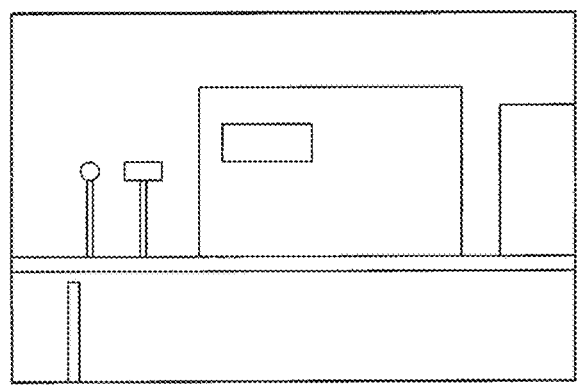
FIG. 3A is a diagram schematically illustrating an example of a captured image.
Figure 3B:
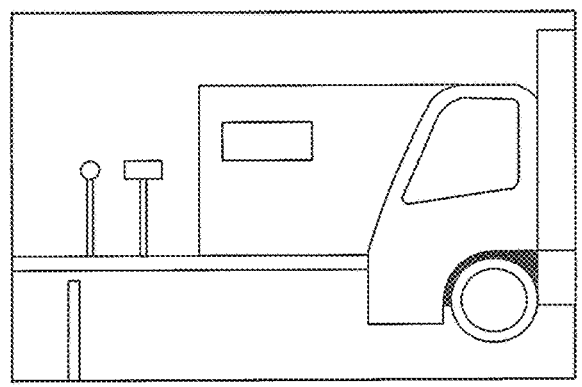
FIG. 3B is a diagram schematically illustrating the example of the captured image.
Figure 3C:
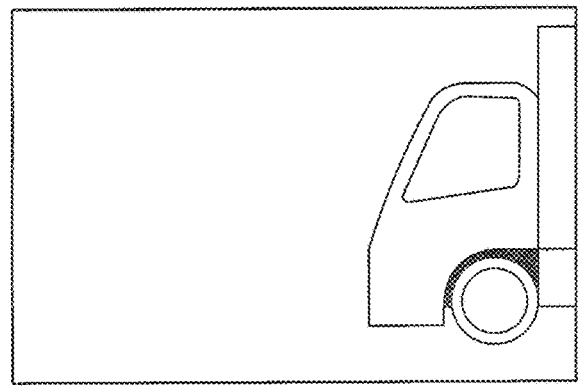
FIG. 3C is a diagram schematically illustrating the example of the captured image.

FIG. 3A to FIG. 3C are diagrams that schematically illustrate an example of the captured image.

The imaging device 10 does not use a lens having a larger (wide) angle of view so that the distortion at the peripheral portion of the imaging range (angle of view) can be reduced at a low level. Accordingly, given the lens of the imaging device 10, it is often difficult to cover all portions of a heavy-duty vehicle such as a truck from its front-end section to its rear-end-section by one round of capturing. In this case, common features of the vehicle portion in multiple images or in a predetermined set of multiple images (some of the captured images selected at predetermined intervals) acquired consecutively at different time points are extracted, and the multiple images are overlaid on each other so that the common features overlap each other and thereby a panoramic photograph is generated, or an image range covering the entirety (i.e., all the tires) of one side of the vehicle is specified by performing settings of the positional relationship between the multiple images.

In the captured image, the background portion other than the traveling vehicle is basically invariable. In view of this, here, as illustrated in FIG. 3A, the background in the imaging range is captured in advance as a background image, and stored and retained as the background image data 223. The data of the image captured in the manner illustrated in FIG. 3B is compared with the background image data 223 to extract portions differing from the background image out of the captured image, and thereby, as illustrated in FIG. 3C, the image of the vehicle portion is obtained. Practically, the background portion may vary slightly depending on the surrounding environment condition such as the direction of incidence of sunlight. Also, in the long term, nearby buildings and structures appearing in the image may change. Accordingly, the background image is acquired (captured) at appropriate time intervals according to time and seasons or the like and the background image data 223 is updated, and multiple pieces thereof are retained.

Also, in addition to simple selection in a binary fashion of portions differing from the background image, the difference between the captured image and the background image may be computed on a per-pixel basis and the difference may further be weighted according to a predetermined condition or conditions such as the size and degree of change of the difference value (for example, in a case where mainly brightness changes, it is possible that the difference is caused by change in the shadows). In this case, for example, a range having a large weighted difference may be defined as the reference portion and the portion having a small weighted difference value may be adopted or discarded on the basis of a profile appropriate as a vehicle.

Figure 3D:
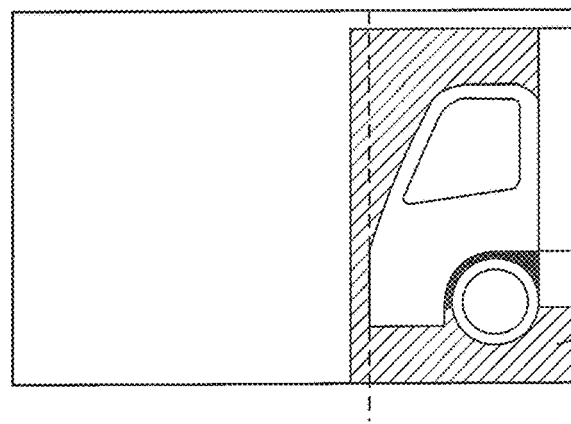
FIG. 3D is a diagram schematically illustrating the example of the captured image.

As illustrated in FIG. 3D, in the captured image of the acquired vehicle, the detection range Ad (partial range) is defined in advance, it is determined whether or not a vehicle is included in the defined range, and thereby the range of one vehicle is decided on. Specifically, when the front-end section of the vehicle enters the detection range Ad, then passage of the front-end section (front end) of the vehicle is detected and, when the rear end-section of the vehicle disappears from the detection range Ad, then the rear-end section (rear end) of the vehicle is detected.

The detection range Ad may be defined, for example, as a range on the upstream side of the vehicle in its traveling direction (the side at which the vehicle enters the range corresponding to the angle of view). Also, the detection range Ad can also be defined such that vehicles on other lanes, pedestrians, trees, and the like are not included therein. Any difference equal to or larger than the reference may be defined to such an extent that, for example, a slight change in the shadow due to change in the sunlight or the like can be excluded. Meanwhile, the difference equal to or larger than the reference is defined as a range that ensures reliable detection of presence or absence of a vehicle. Since the detection range Ad is two-dimensionally defined, the vehicle does not need to be detected at the moment when the front-end section of the vehicle has entered the detection range Ad, or a state where the vehicle is not anymore detected does not need to be entered at the moment when the rear-end section of the vehicle disappears to be out of the detection range Ad. Detections should be made such that the front-end section (front end) of a vehicle is included in the image a predetermined proportion or more of which is occupied by the vehicle for the first time and the rear-end section (rear end) of the same vehicle is included in the image a predetermined proportion or more of which has been occupied in the last place.

FIG. 4A to FIG. 4D are diagrams that illustrate an example of the acquired image data of the vehicle.

Figure 4A:
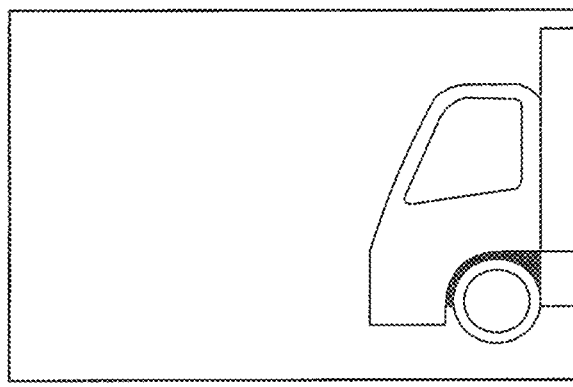
FIG. 4A is a diagram illustrating an example of acquired image data of a vehicle.
Figure 4B:
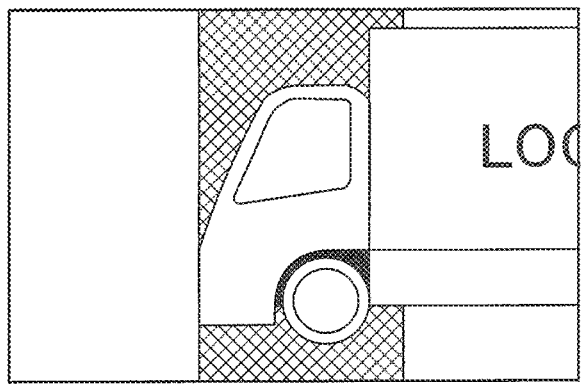
FIG. 4B is a diagram illustrating the example of the acquired image data of the vehicle.
Figure 4C:
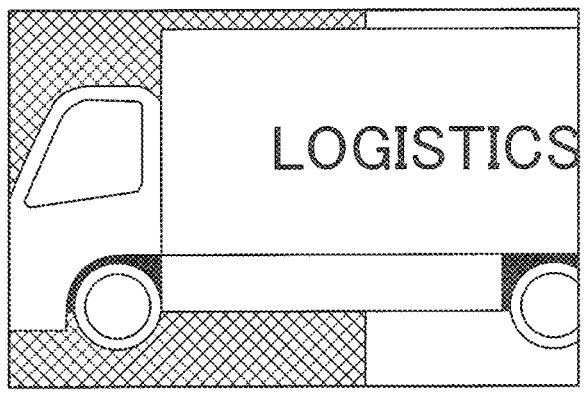
FIG. 4C is a diagram illustrating the example of the acquired image data of the vehicle.
Figure 4D:
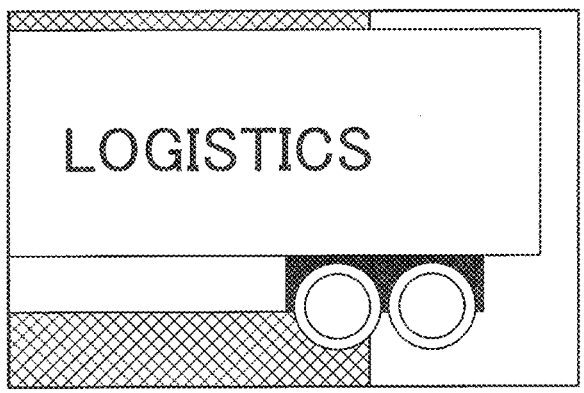
FIG. 4D is a diagram illustrating the example of the acquired image data of the vehicle.

Here, as illustrated in FIG. 4A, when the image data that includes the front end of the vehicle has been obtained, in the next and subsequent images, until the rear-end section of the same vehicle is detected, a vehicle having a vehicle portion identical with a corresponding portion of the captured image which has already acquired is specified. As illustrated in FIG. 4B to FIG. 4D, the hatched portion is the portion identical with the corresponding vehicle portion that has already been specified in the previous image data. In addition, as can be appreciated from the FIG. 4D, a captured image of the entire vehicle can be obtained as an elongated panoramic photograph by connecting all or some of the four images including the one in which the rear end of the vehicle has been detected (here, an image of the entire vehicle can be obtained even when only the two images of FIG. 4B and FIG. 4D are used).

FIG. 5A to FIG. 5D are diagrams that illustrate a panoramic photograph which can be acquired at the stage where the respective images of FIG. 4A to FIG. 4D have been obtained.

Figure 5A:
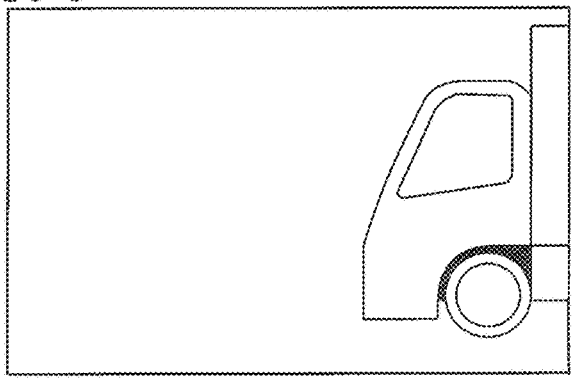
FIG. 5A is a diagram illustrating an example of a panoramic photograph.
Figure 5B:
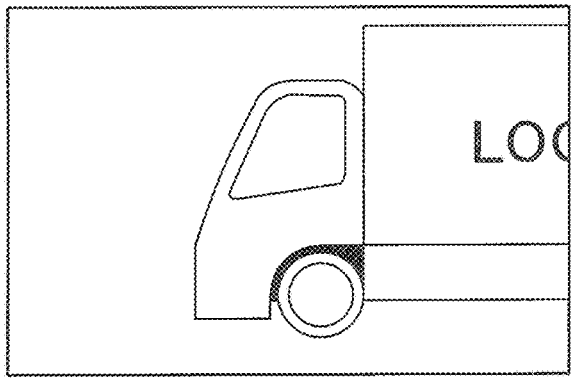
FIG. 5B is a diagram illustrating the example of the panoramic photograph.
Figure 5C:
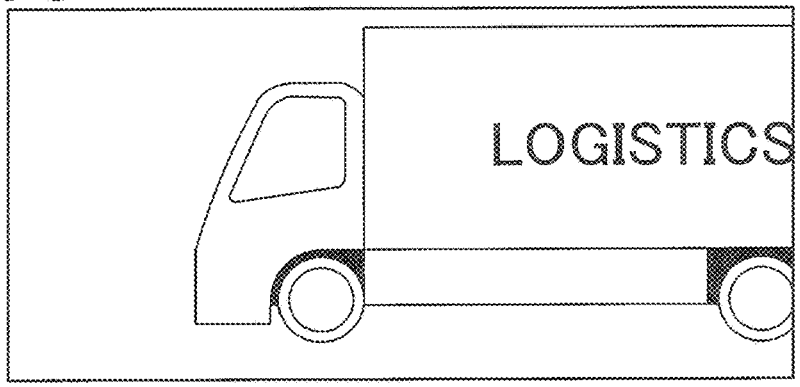
FIG. 5C is a diagram illustrating the example of the panoramic photograph.
Figure 5D:
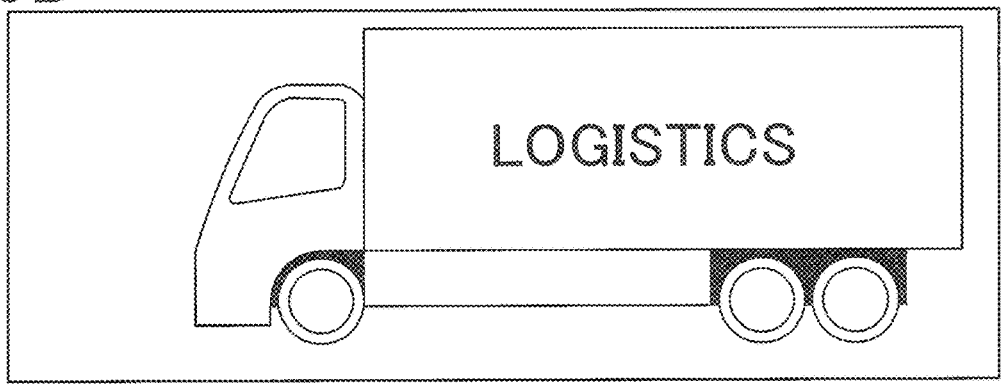
FIG. 5D is a diagram illustrating the example of the panoramic photograph.

FIG. 5A is a single image identical with that of FIG. 4A. FIG. 5B may be combined with FIG. 4A, FIG. 4B or may be replaced by FIG. 4B. As illustrated in FIG. 5C and FIG. 5D, the full image becomes more horizontally elongated as more images are combined.

Figure 6A:
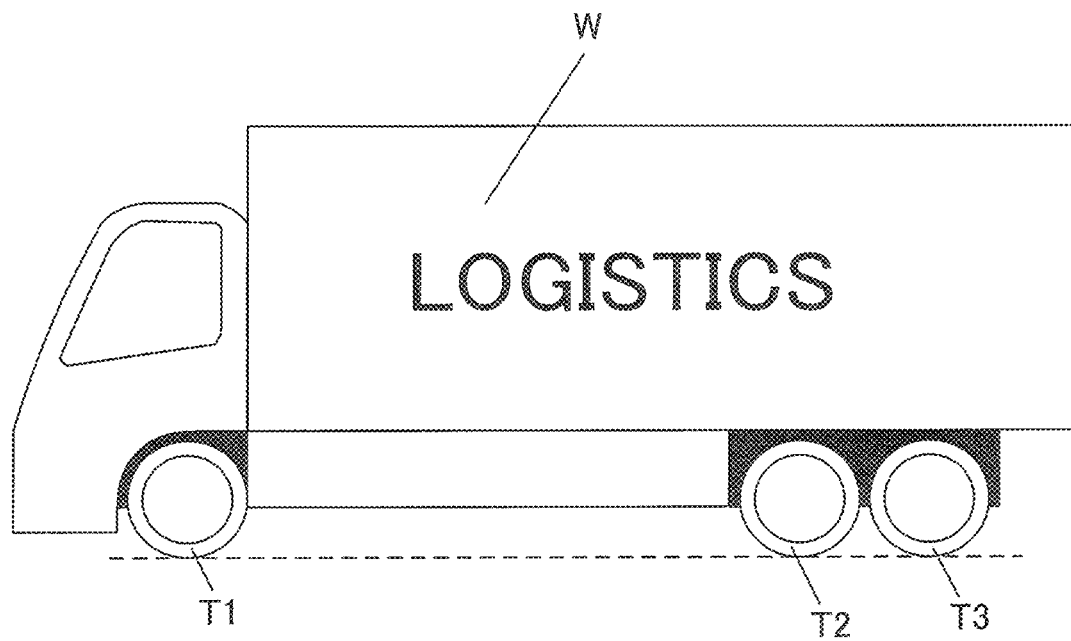
FIG. 6A is a diagram describing a state of a tire.
Figure 6B:
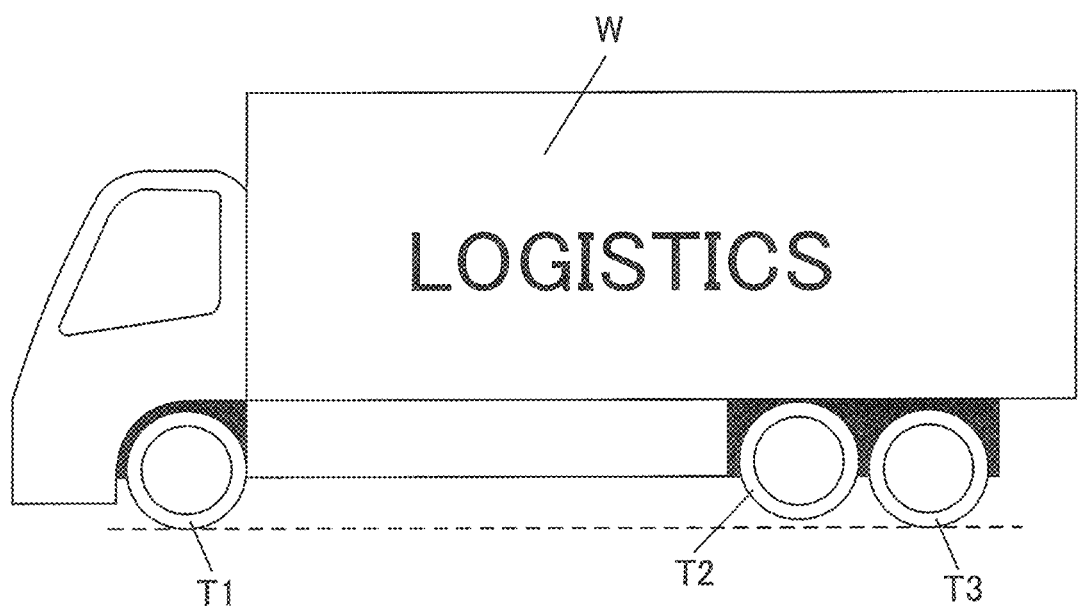
FIG. 6B is a diagram describing the state of the tire.

FIG. 6A and FIG. 6B are diagrams that describe the state of the tire.

As illustrated in FIG. 6A, here, in a vehicle W that includes three tires T1 to T3 on one side thereof, during normal traveling, the lower ends of these tires T1 to T3 are aligned at their respective positions on the same plane in the horizontal direction. In contrast, it will be appreciated, as illustrated in FIG. 6B, that, when any one of the tires, here, the tire T2, is raised and disengaged from the road surface through automatic lift (lift axle) control, the lower end of the tire T2 (the predetermined part in this situation) resides at a higher position than those of the lower ends of the tires T1 and T3 in the height direction, specifically, at a higher position in the perpendicular direction (vertical direction) in the image data. In this manner, the locations of the respective tires T1 to T3 are specified from the obtained image data and it is determined whether or not any one or some of the tires are at positions different from each other in the perpendicular direction, and thereby the determination is performed as to whether or not all the tires T1 to T3 are in contact with the ground. In a case where there is snow and/or puddle on the road surface, or in a case where mud adheres to the periphery of the tires T1s to T5s, when it is not possible to specify the lower ends of the tires T1s to T5s, then the same or similar determination may be performed on the basis of the rotation axis positions (i.e., the positions of the axles) and/or upper end positions of the tires T1 to T3.

Figure 7A:
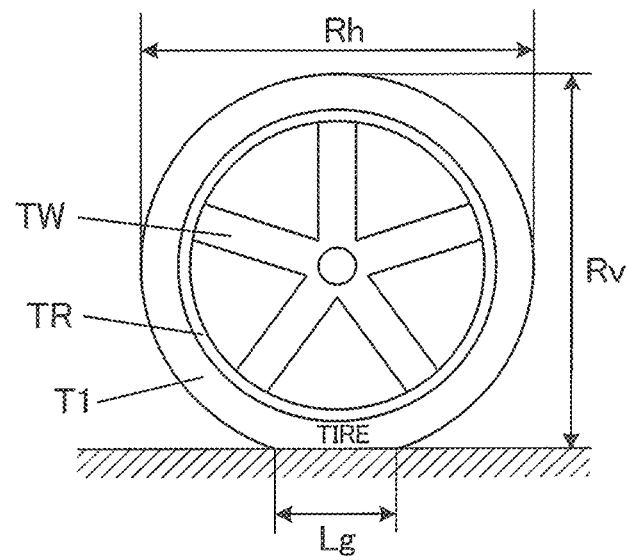
FIG. 7A is a diagram of the tire as an enlarged view.
Figure 7B:
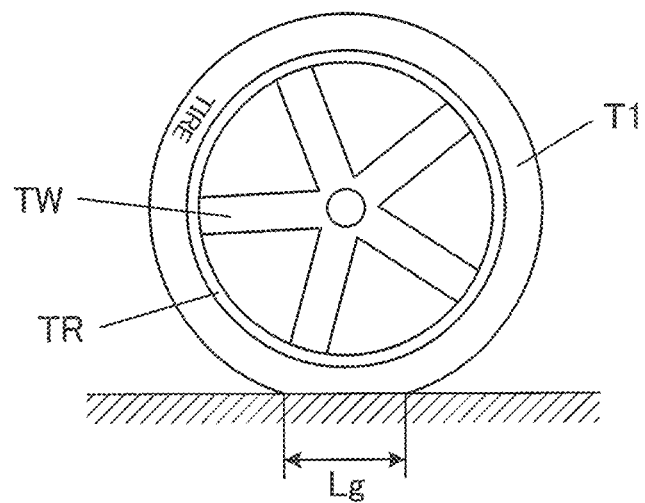
FIG. 7B is a diagram of the tire as an enlarged view.

FIG. 7A and FIG. 7B are diagrams of the tire T1 in an enlarged view. While the tire T1 is depicted here, the same applies to other tires such as a tire T3 that is in contact with the ground.

As illustrated in FIG. 7A, the tire T1 is deformed on at a plane in contact with the ground (a line when it is viewed from the side) by being pressed against the ground by the vehicle's own weight. Here, the tire T has a lower end position deformed (flattened) so as to be in contact with the ground linearly over the width Lg. Since such deformation does not occur in a tire that is not in contact with the ground at the lower end position of the same tire, the determination of presence or absence of the contact of the tires with the ground can also be performed based on the presence or absence of the distortion. In this case, as the degree of deformation is of no relevance, it is not necessary to accurately determine the length of the linear lower end. Specifically, if a part of the linear portion is detected at all, it is not necessary to be able to determine whether or not the remaining portion is in a linear shape due to attachment of mud or the like. A rim TR and a wheel TW to which the tire T1 is attached are not deformed regardless of presence or absence of contact with the ground. Specification of presence or absence of distortion is performed by specifying whether or not the length of the above-described linear portion is "0." Alternatively, presence or absence of distortion due to the tire being in contact with the ground can also be specified by the difference between the vertical width Rv (width in the height direction) and the horizontal width Rh (width in the horizontal direction) of the tire T1. If distortion occurs, the vertical width Rv will be a value smaller than the horizontal width Rh. Likewise, the distance from the rotation axis position to the lower end position of the tire T1 will have a difference from the distance from the rotation axis position to the upper end position or to the right and left end positions when the lower end of the tire T1 is in contact with the ground.

Also, when the tire T1 is in contact with the ground, the tire T1 is rotated in accordance with traveling of the vehicle. Accordingly, as illustrated in FIG. 7B, presence or absence of rotation of the tire T1, i.e., whether or not the tire T1 is in contact with the ground, can be determined based on whether or not the rotation angle of the tire T1 captured at a different time point from FIG. 7A is different therefrom. The rotation angle should be determined based on, for example, the change in the apparent angle of the structure and/or design of the wheel TW and/or the change in the apparent angle of a marker or pattern provided on the surface (side surface) of the tire T1.

Also, when the rotation axis position of the tire T1 cannot be directly specified, for example, the central position of the non-deformable circular rim TR is specified as the rotation axis position. Arbitrary three or more points (multiple points) on the outer edge of the rim TR are specified, a circle that includes the three or more points is drawn and fitted, and thereby the center of the circle is computed as the rotation axis position. Alternatively, instead of the points on the outer edge of the rim TR, rotation axis position may be computed on the basis of multiple points on the outer edge of the tire T1 (points that are not in contact with the ground). Also, in addition to the lower end position of the tire T1, if the upper end position thereof cannot be specified, either, due to mud or the like, instead of the upper end position of the tire T1, the upper end position or lower end position of the rim TR may be specified.

Figure 8A:
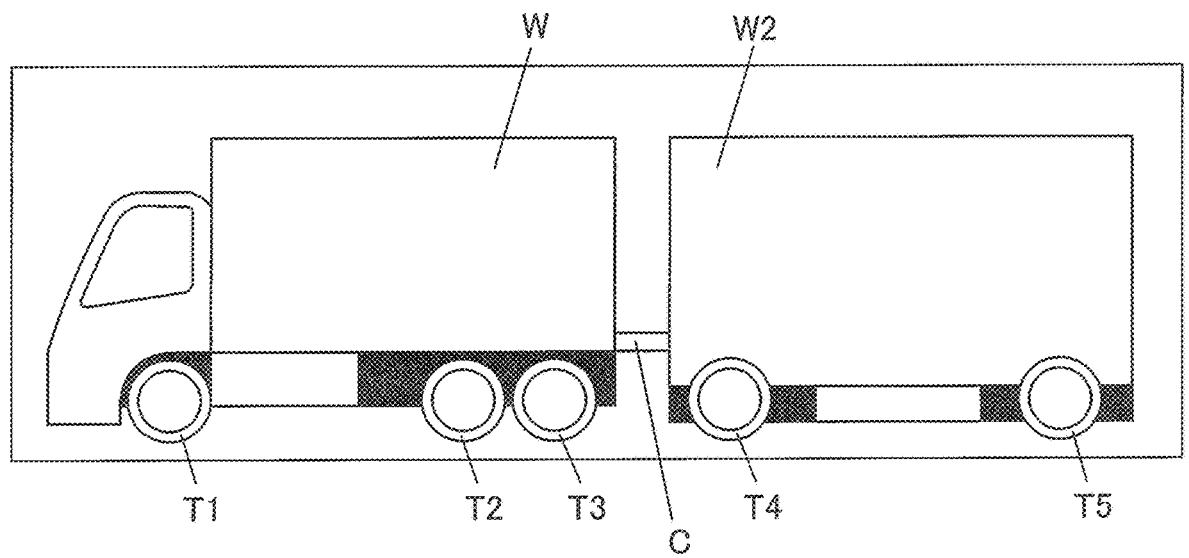
FIG. 8A is a diagram describing another example of the captured image.
Figure 8B:
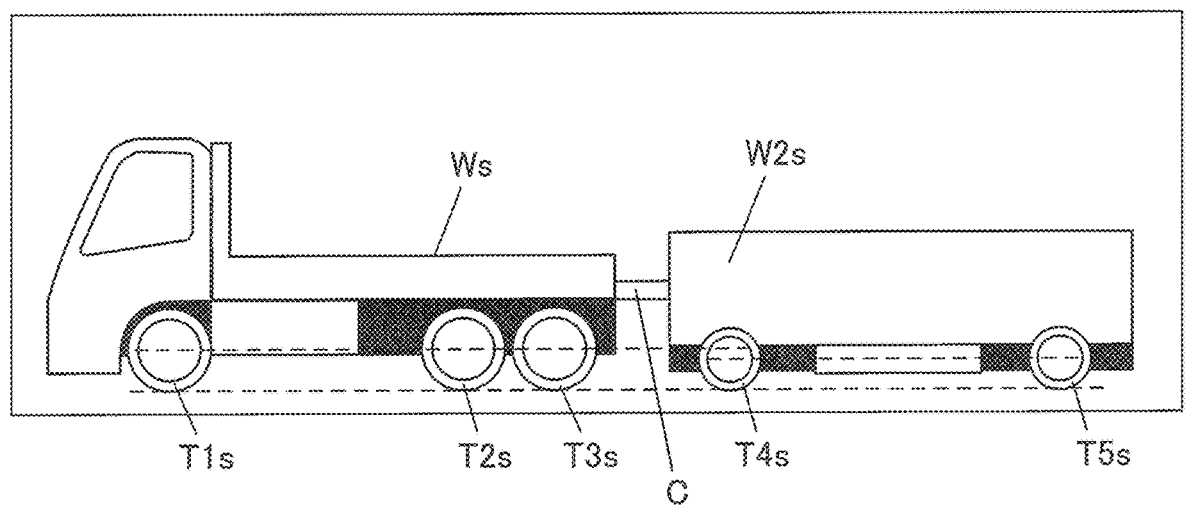
FIG. 8B is a diagram describing the other example of the captured image.

FIG. 8A and FIG. 8B are diagrams that illustrate another example of the captured image.

This captured image is a composite one in which the vehicle as a whole has been reproduced as a panoramic photograph.

In the example illustrated in FIG. 8A, the towed vehicle W2 is connected to the vehicle W via the corrector C. The towed vehicle W2 travels while being towed by the vehicle W. In this case, the vehicle W and the towed vehicle W2 are regarded as one single vehicle, where the number of axles will be the sum of the number of axles of the vehicle W and the number of axles of the towed vehicle W2. In the captured image, determination can be readily made with multiple vehicles traveling in an integral manner regarded as one single vehicle by detection of such a corrector C within the detection range Ad defined two-dimensionally as discussed in the foregoing, in particular within the detection range Ad which is defined with sufficient width in the perpendicular direction relative to the height of the vehicle.

As can be appreciated from FIG. 8B, there may be a case where the diameters of the tires T4s and T5s of the towed vehicle W2s are different from the diameters of the tires T1s, T2s, and T3s of the vehicle Ws towing the towed vehicle W2s. In this manner, in a case where the diameters (sizes of the tires) of one of the two vehicles are different from the diameters of the other of them, the heights at which the respective tires T1s to T5s are in contact with the ground are equal to each other regardless of the diameters of the tires. However, even in a case where all the tires T1s to T5s are in contact with the ground, the rotation axis positions of the tires T1s to T3s and the rotation axis position of the tires T4s and T5s differ from each other depending on the diameters of the tires. In a case where whether or not the tires T1s to T5s are in contact with the ground should be determined using the rotation axis positions, it is confirmed whether or not the diameters of these tires are equal to each other and, if the diameters of the tires are not equal to each other (at least any one of the sizes of the tires is different from those of the others), it is necessary to perform corrections according to the difference in the diameters of the tires. For example, virtual lower end positions of the tires may be determined, where the virtual lower end positions are determined by subtracting the radius of each tire from the height position of the rotation axis position of the same tire (i.e., defined on the premise that the tire is not deformed even when it is in contact with the ground), and these virtual tire lower end positions may be compared with each other.

Alternatively, a reference tire may be defined and, with regard to a tire having a diameter different from that of the reference tire, the tire at issue may be subjected to correction by subtracting, from its rotation axis position, the radius of the same tire and then adding thereto the radius of the reference tire so that the position corresponds to the rotation axis position of the reference tire. Also, instead of the rotation axis position of the tire, an upper end position of the tire, a lower end position or an upper end position of a rim, etc. may be used. In these cases as well, if a diameter(s) of any one or some of the tires is different from those of the others, a virtual lower end position of the tires may be determined by respectively subtracting the diameter, a difference between a radius of the tire and a radius of a rim, and a sum of this difference and the diameter of the rim, and the like.

Figure 9A:
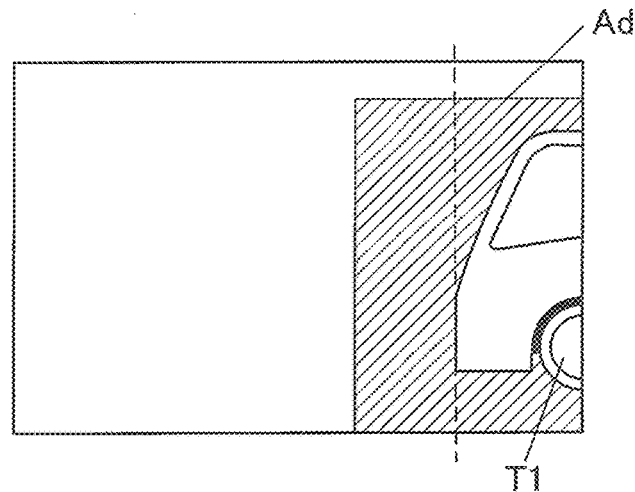
FIG. 9A is a diagram describing detection of front-end and rear-end sections of a vehicle that includes a towed vehicle.
Figure 9B:
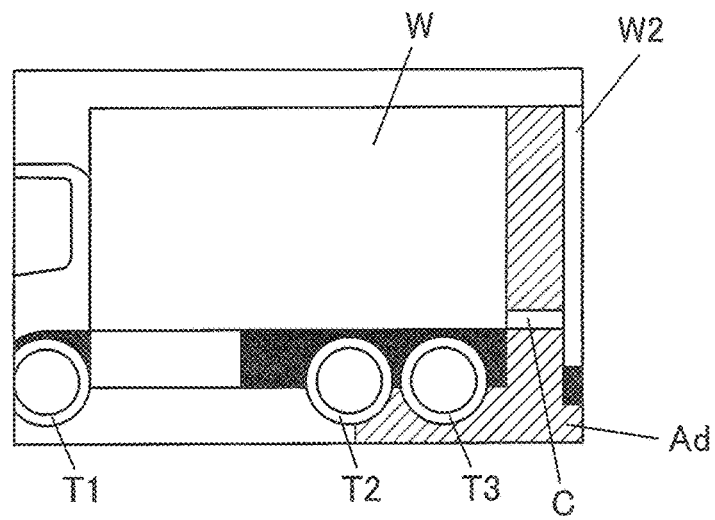
FIG. 9B is a diagram describing detection of the front-end and rear-end sections of the vehicle that includes the towed vehicle.
Figure 9C:
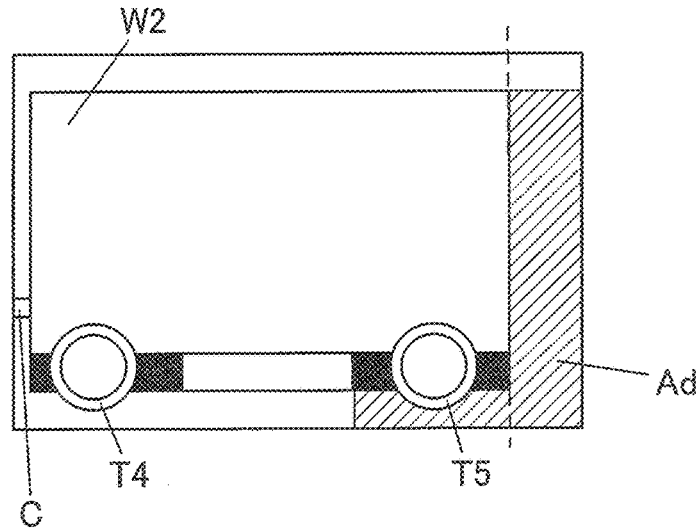
FIG. 9C is a diagram describing detection of the front-end and rear-end sections of the vehicle that includes the towed vehicle.

FIG. 9A to FIG. 9C are diagrams that describe detection of front-end and rear-end sections of a vehicle that includes a towed vehicle W2.

As illustrated in FIG. 9A, the front end of the vehicle W is normally detected within the detection range Ad. As illustrated in FIG. 9B, even in a case where the towed vehicle W2 is connected thereto, since the corrector C is included in the detection range Ad, the rear-end section of the vehicle W is not specified as the rear-end section of the vehicle as a whole. As illustrated in FIG. 9C, when the rear-end section of the towed vehicle W2 is specified in the detection range Ad, the rear-end section of the vehicle as a whole is established. The detection range Ad may have any appropriate width in the horizontal direction relative to the angle of view of the captured image in accordance with detection accuracy and the like.

Figure 10:
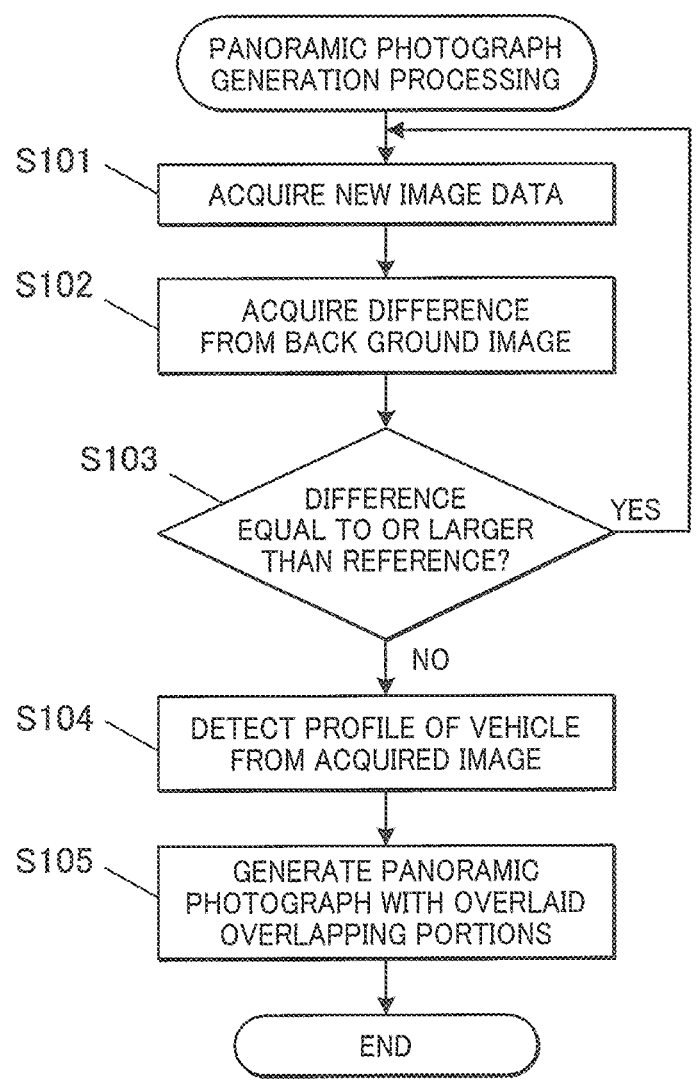
FIG. 10 is a flowchart illustrating a control procedure of panoramic photograph generation processing.

FIG. 10 is a flowchart that illustrates a control procedure by the controller 21 of panoramic photograph generation processing executed by the processing device 20 of this embodiment.

The panoramic photograph generation processing is started when a next piece of image data to be subjected to the processing is received after the preceding panoramic photograph generation processing has been completed. When the panoramic photograph generation processing is started, the controller 21 acquires the new piece of image data that has been received (the step S101). The controller 21 compares the acquired image with the background image to acquire the difference therebetween (the step S102). Also, the controller 21 extracts from the acquired image a pixel portion that includes a difference equal to or larger than a noise level which is a reference, and generates an extracted image. The controller 21, as a result of the comparison, determines whether or not there is any difference equal to or larger than the reference within the detection range Ad (partial range) (the step S103; boundary detector). In other words, the controller 21 determines whether or not the vehicle occupies a predetermined proportion or a proportion larger than that within the detection range Ad.

If it has been determined that there is a difference equal to or larger than the reference (Yes in the step S103), then the process by the controller 21 goes back to the step S101. If it has been determined that there is not a difference equal to or larger than the reference (No in the step S103), then the controller 21 detects a profile of the vehicle from the respective extracted images that have been acquired since the start of the panoramic photograph generation processing (the step S104). The controller 21 detects overlapping portions of the profiles in the multiple acquired images, and generates a panoramic photograph such that the overlapping portions overlap each other (the step S105; image generator). At this point, the controller 21 can detect a difference of the images of the tires included in the overlapping portions and determine whether or not the respective tires are being rotated. And the controller 21 ends the panoramic photograph generation processing.

The processes at the steps S102 and S104 by the controller 21 constitute the vehicle detector in the image processing device of this embodiment.

Figure 11:
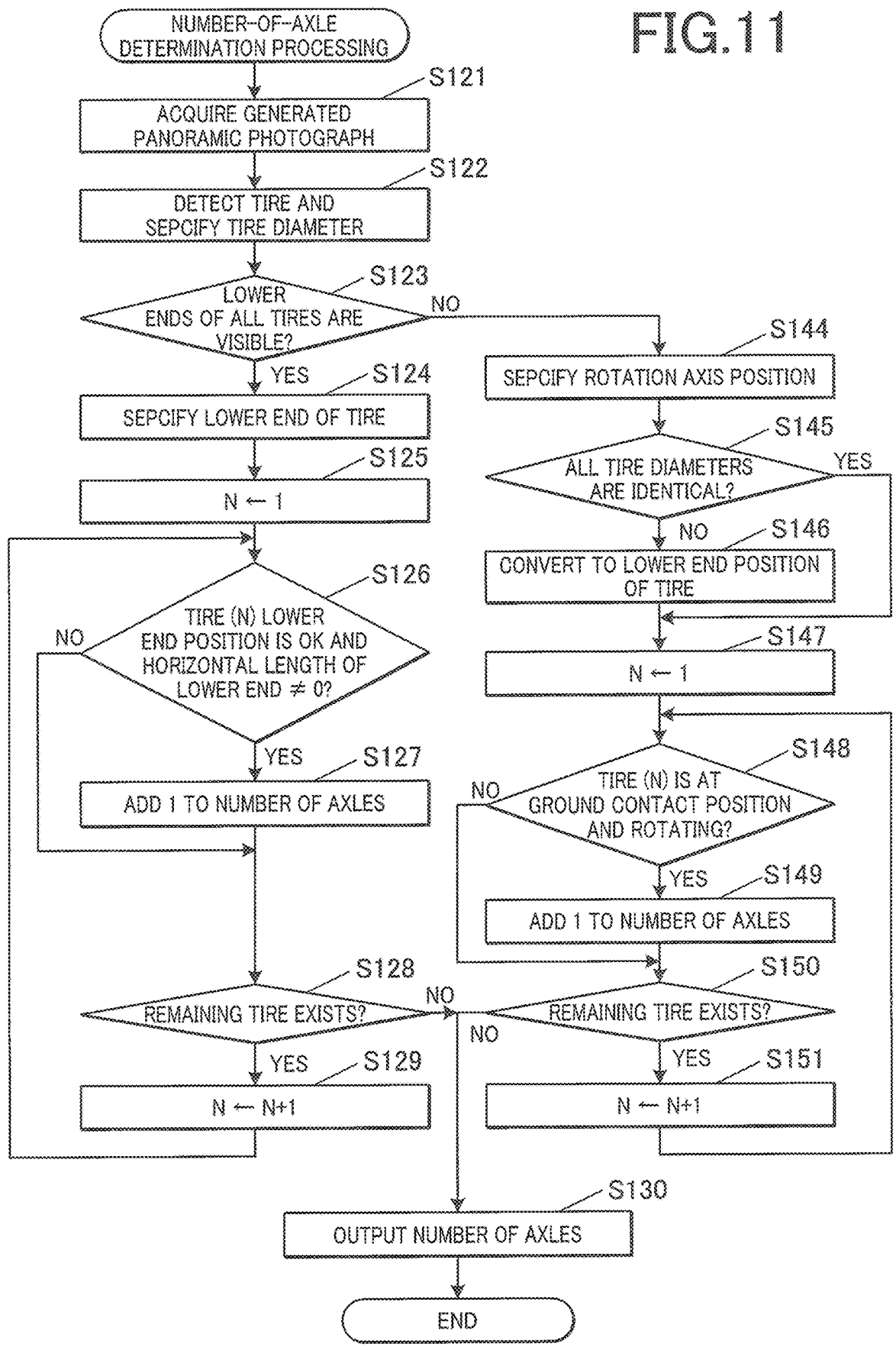
FIG. 11 is a flowchart illustrating a control procedure of number-of-axles determination processing.

FIG. 11 is a flowchart illustrating a control procedure by the controller 21 of number-of-axles determination processing executed by the processing device 20. The number-of-axles determination processing is triggered every time a panoramic photograph is generated in the above-described panoramic photograph generation processing. It should be noted that, at the start of it, a variable N which will be described later is initialized to "0."

If the number-of-axles determination processing is started, the controller 21 acquires the data of the panoramic photograph that has been generated (the step S121). The controller 21 detects the tires from the panoramic photograph and specifies the diameters of the respective tires (the step S122).

The controller 21 determines whether or not the lower ends of all the tires that have been detected are visible (the step S123). If it has been determined that the lower ends of the tires are visible (Yes in the step S123), the controller 21 specifies the lower end positions of the tires and specifies the horizontal lengths of the lower ends (the step S124; specifier). The controller 21 adds one to the variable N (the step S125).

The controller 21 determines whether or not the lower end position of the N-th tire (N) does not reside at a higher position as compared with the lower end positions of the other tires (it is OK) and the horizontal length of the lower end of this tire (N) is "0," i.e., whether or not the tire (N) is deformed at the lower end position (the step S126; the determination unit that determines whether or not the tire is in contact with the ground). For example, the controller 21 computes the average value (average position) of the height direction coordinates of the lower end positions of all the specified tires and compares the height direction coordinate of the lower end positions of the tire (N) (i.e., each of the tires) with the average value. When all the tires are in contact with the ground, the lower end position of the tire (N) becomes equal to the average value. When any of the tires is raised and disengaged from the ground, the lower end position of the tire (N) in contact with the ground becomes lower than the average value. Also, when the tire (N) is in contact with the ground, the lower end of the tire (N) is slightly deformed and flattened according to the weight of the vehicle that the tire (N) bears. Accordingly, in this case, the horizontal length of the lower end position of the tire (N) will not be "0." When the lower end position of the tire (N) is higher (larger) than the average value (i.e., the lower end positions of the other tires), it is possible to determine that the tire (N) is not in contact with the ground.

If it has been determined that the height direction coordinate of the lower end position of the tire (N) is equal to or lower than the average value and the horizontal length of the lower end position of the tire (N) is not "0" (Yes in the step S126), the controller 21 adds "1" to the number of axles (the step S127; the number-of-axles counter that counts the number of axles). After that, the process by the controller 21 proceeds to the step S128. If it has been determined that the height direction coordinate of the lower end position of the tire (N) is larger than the average value or the horizontal length of the lower end position of the tire (N) is "0" (No in the step S126), the process of the controller 21 proceeds to the step S128.

If transition is made to the process at the step S128, the controller 21 determines whether or not there is any remaining tire on which the determination of contact or non-contact with the ground has not yet been made (the step S128). Specifically, the controller 21 determines whether or not the value of the variable N is smaller than the number of tires that has been detected. If it has been determined that the remaining tire exists (Yes in the step S128), then the controller 21 adds "1" to the variable N (the step S129). After that, the process by the controller 21 goes back to the step S126.

If it has been determined that no remaining tire exists (No in the step S128), then the controller 21 establishes and outputs the data of the computed number of axles (the step S130). In addition, the controller 21 ends the number-of-axles determination processing.

If it has been determined in the determination process at the step S123 that a lower end of at least any one of the tires is not visible (No in the step S123), the controller 21 specifies the rotation axis positions of the respective tires (the step S144). For example, the controller 21 may determine a point that is equidistant from a plurality of points on the tire's outer edge or the rim and thereby specify the rotation axis position of the tire. Alternatively, the controller 21 may specify the rotation axis position from the intersection of the vertical line passing through the top point of the tire and the horizontal line passing through the left end and right end points of the tire.

The controller 21 determines whether or not the detected diameters of all the tires are equal to each other (the step S145). If it has been determined that they are not equal to each other (No in the step S145), the controller 21 corrects the position of the tire (the step S146). The controller 21, for example, subtracts the tire's radius from the height direction coordinate of the specified rotation axis position to compute an assumed tire lower end position. Since the assumed tire lower end position does not takes into account the above-described deformation of the tire, it is different from the actual tire lower end position of the tire in contact with the ground. After that, the process by the controller 21 proceeds to the step S147. If it has been determined that the diameters of all the tires are equal to each other (Yes in the step S145), the process of the controller 21 proceeds to the step S147.

If transition is made to the process at the step S147, the controller 21 adds "1" to the variable N (the step S147). The controller 21 determines whether or not the tire (N) which is an N-th tire resides at a position in contact with the ground and the rotation of the tire (N) has been detected (the step S148). The controller 21, for example, in the same manner as in the process at the step S126, computes in advance average values of the specified or computed rotation axis positions and height direction coordinates of the tire lower end positions, compares the average value with the height direction coordinates of these values of the tire (N), and thereby determines whether or not tire (N) is in contact with the ground. Presence or absence of rotation of each tire can be acquired by the process at the step S105 as described above. If it has been determined that tire (N) is in contact with the ground and the tire (N) is being rotated (Yes in the step S148), then the controller 21 adds "1" to the number of axles (the step S149). After that, the process by the controller 21 proceeds to the step S150. If it has been determined that the tire (N) is not in contact with the ground or the tire (N) is not being rotated (No in the step S148), then the process of the controller 21 proceeds to the step S150.

If transition is made to the process at the step S150, the controller 21 determines whether or not there is any tire on which the determination of contact or non-contact with the ground has not yet been made (the step S150). Specifically, the controller 21 determines whether or not the value of the variable N is smaller than the number of tires that has been detected. If it has been determined that the remaining tire exists (Yes in the step S150), then the controller 21 adds "1" to the variable N (the step S151). After that, the process by the controller 21 goes back to the step S148.

If it has been determined that no remaining tire exists (No in the step S150), then the process of the controller 21 proceeds to the step S130.

Figure 12:
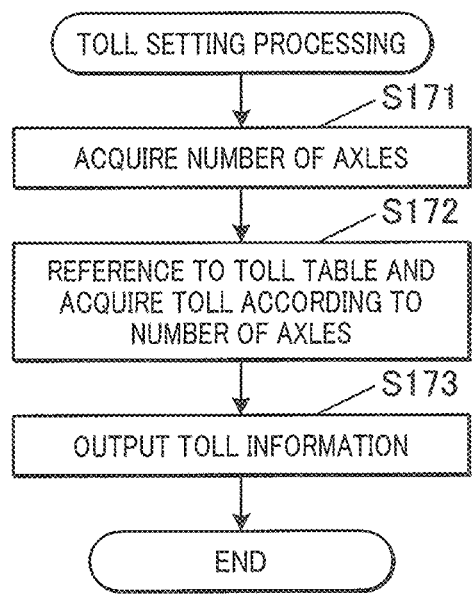
FIG. 12 is a flowchart illustrating a control procedure of toll setting processing.

FIG. 12 is a flowchart illustrating a control procedure by the controller 21 of toll setting processing. The toll setting processing is operation as the determination unit of the controller 21 in the processing device 20 of this embodiment, and is started when the number of axles has been output by the number-of-axles determination processing.

The controller 21 acquires the number of axles of the vehicle (the step S171). The controller 21 refers to the toll table 222 and acquires the toll according to the number of axles (the step S172). The controller 21 outputs the acquired toll to a predetermined external device, here, a toll collection device (the step S173). And the controller 21 ends the toll setting processing.

Figure 13:
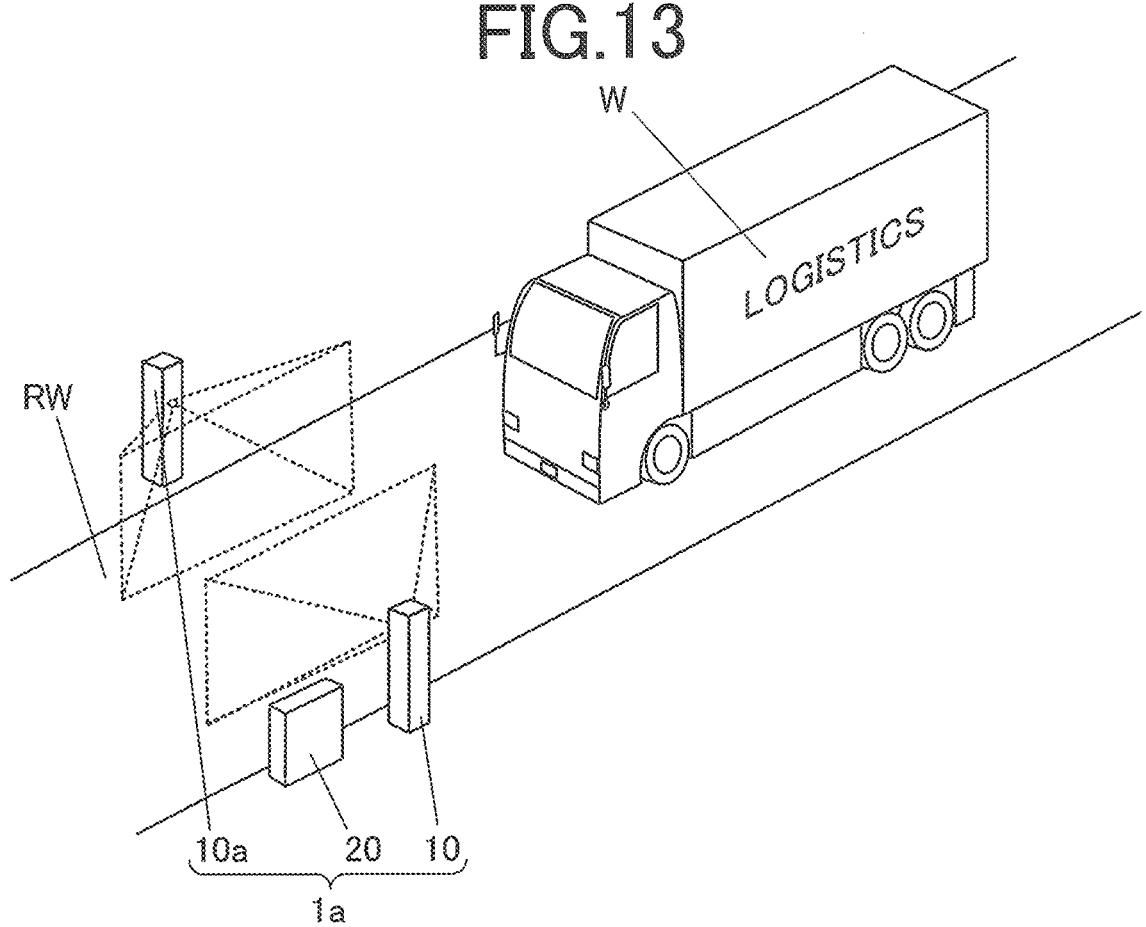
FIG. 13 is a diagram illustrating a number-of-axles detection system of another embodiment.

FIG. 13 is a diagram illustrating a number-of-axles detection system 1a of another embodiment.

In this number-of-axles detection system 1a, an imaging device 10a is provided on the opposite side of the imaging device 10 in the width direction of the travel route RW. As a result, in the number-of-axles detection system 1*a*, capturing operations of both sides of the vehicle W are performed in parallel with each other.

In this number-of-axles detection system 1*a*, panoramic photographs are respectively generated from the images respectively captured from different directions by the imaging devices 10 and 10*a*. At the time of generation of the panoramic photographs, it is determined which of the panoramic photographs more appropriately captures the tire or the vehicle body, and the panoramic photograph that more appropriately captures them is selected to be used in the number-of-axles determination processing.

It should be noted that the imaging angles for the imaging devices 10 and 10*a* to capture the vehicle body is not limited to the direction perpendicular to the direction in which the travel route RW extends. If it is not a perpendicular direction, the captured image may be subjected to coordinate conversion as appropriate and used so that the determination of the number of axles is facilitated.

The determination of which of the panoramic photographs is more appropriate may take into account, for example, direction of incidence of sunlight, the direction in which dusts swirl and go up by wind, the direction of rain drops, or, alternatively, a surrounding environment condition such as snow and mud asymmetrically attached to the vehicle. The determination of the appropriateness may be defined, for example, a sum of weighted values of the difference between the captured image and the background image. Also, with regard to dust, rain, etc., a more appropriate panoramic photograph may be selected by subjecting the generated images to image processing to decrease the conspicuousness of (or reduce) these noise elements and then comparing the panoramic photographs after the image processing with each other.

Figure 14:
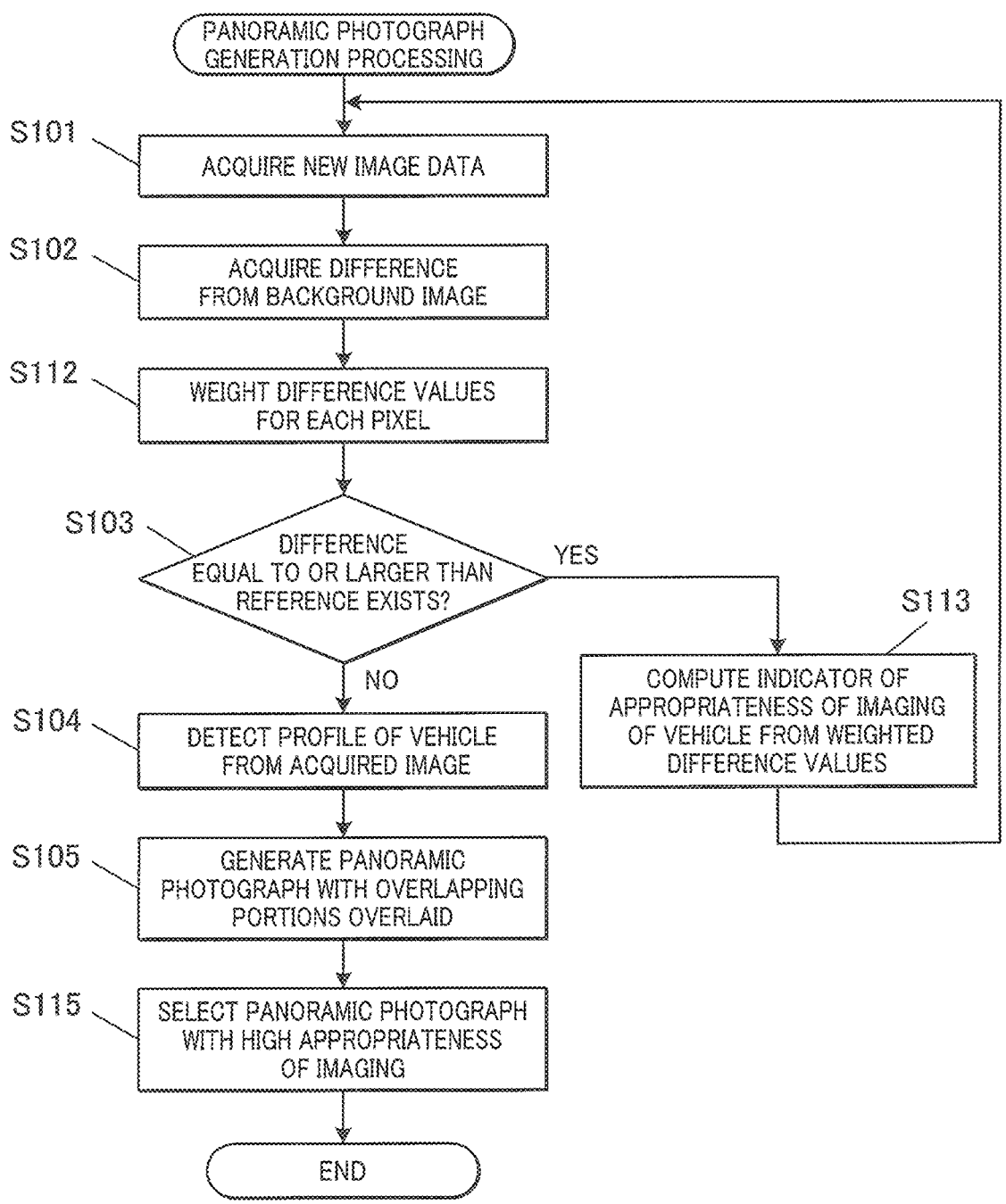
FIG. 14 is a flowchart illustrating a control procedure of panoramic photograph generation processing executed by a number-of-axles detection system of another embodiment.

FIG. 14 is a flowchart illustrating a control procedure by the controller 21 of panoramic photograph generation processing executed by the processing device 20 of the number-of-axles detection system 1*a* of this embodiment. In this panoramic photograph generation processing, the steps S112, S113, and S115 are added to the panoramic photograph generation processing that has been illustrated in FIG. 10. The other processing steps are the same and the same processing steps are assigned the same reference signs and detailed explanations thereof will be omitted.

After the process at the step S102, the controller 21 weights the difference value for each pixel of the detection range Ad (the step S112). After that, the process by the controller 21 proceeds to the step S103. If the positive "Yes" determination has been made by the determination process at the step S103 and the process branches off therefrom, then the controller 21 computes an indicator of the appropriateness of imaging of the vehicle detected from the weighted difference value (the step S113). The appropriateness of imaging may be, for example, a simple average value or a sum of the weighted difference values. Also, the average value may be determined only for pixels whose difference values are equal to or larger than a predetermined value. After that, the process by the controller 21 goes back to the step S101.

After the process at the step S105, the controller 21 selects a panoramic photograph having a higher indicator of the appropriateness of imaging of each image associated with generation of the panoramic photograph (the step S115). And the controller 21 ends the panoramic photograph generation processing.

Figure 15:
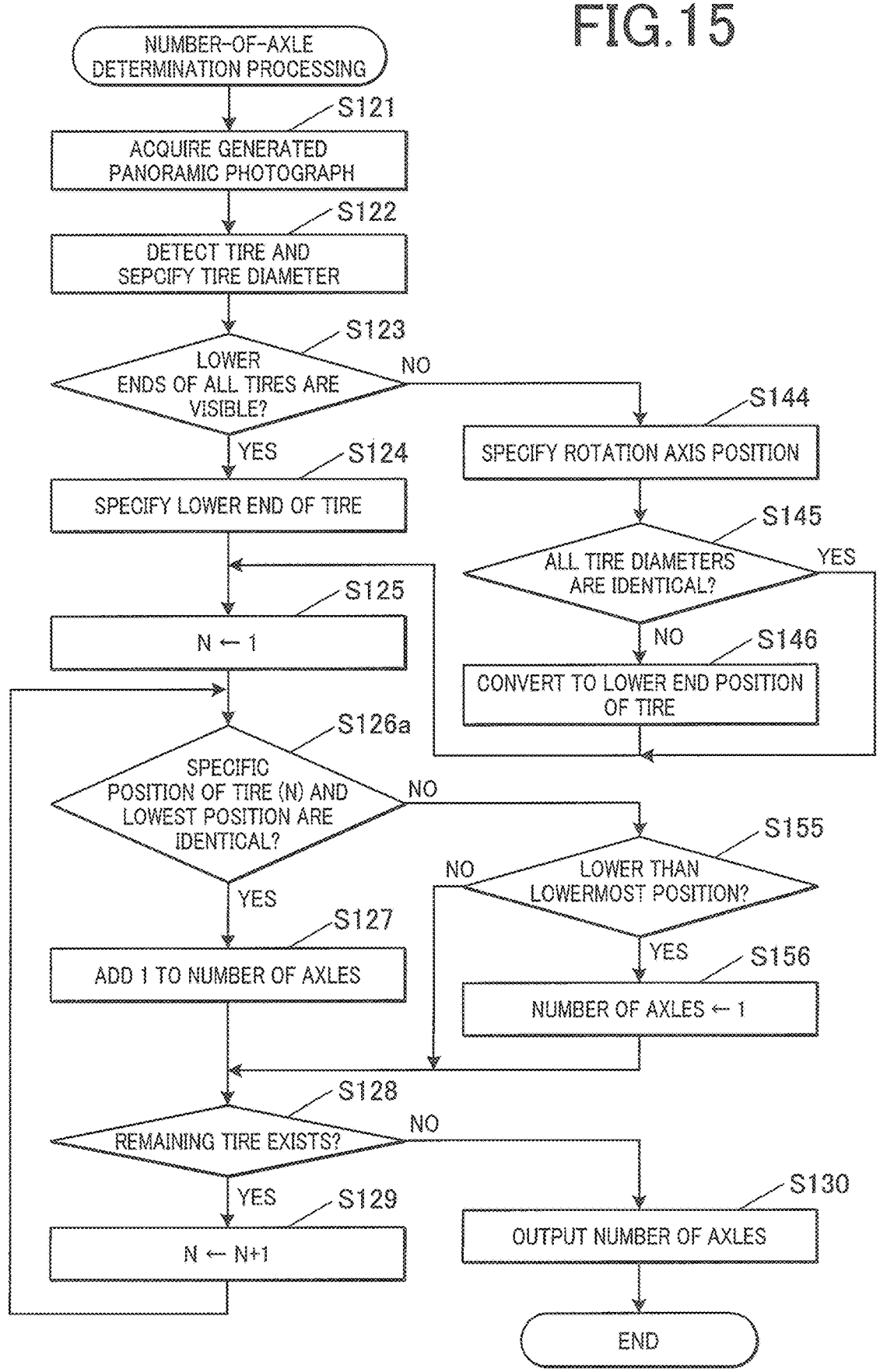
FIG. 15 is a flowchart illustrating a control procedure of a modified example of the number-of-axles determination processing.

FIG. 15 is a flowchart illustrating a control procedure of a modified example of the number-of-axles determination processing.

In this number-of-axles determination processing, the processes at the step S155, S156 are added to the number-of-axles determination processing that has been illustrated in FIG. 11, and the process at the step S126 is replaced by the process at the step S126*a*. Also, the processes at the steps S147 to S151 are deleted and the order of processing is modified. The same processing steps are assigned the same reference signs and detailed explanations thereof will be omitted.

If the "Yes" determination is made at the step S145 and the process branches off therefrom, then the process of the controller 21 proceeds to the step S125 after the processes at the step S146.

After the process at the step S125, the controller 21 determines whether or not a specific position of the tire (N), i.e., the lower end position (the steps S124, S146) or the rotation axis position (the step S144), is equal to the lowest value of the lowest positions of the previous tires (1) to (N−1), i.e., the specific position in the height direction (the step S126*a*). If it has been determined that they are equal to each other (Yes in the step S127), then the process of the controller 21 proceeds to the step S127.

If it has been determined that it is not equal to the lowest position (No in the step S126*a*), then the controller 21 determines whether or not the specific position is lower than the lowest position (the step S155). If it has been determined that it is lower than the lowest position (Yes in the step S155), then the controller 21 sets the number of axles to "1" (the step S156). After that, the process by the controller 21 proceeds to the step S128. If it has been determined that it is not lower than (is higher than) the lowest position (NO in the step S155), then the process of the controller 21 proceeds to the step S128.

Specifically, in contrast to the number-of-axles determination processing of the embodiment illustrated in FIG. 11, it is determined whether or not it is in contact with the ground without using the average value of the specific position of the tire (N), but relying on the fact that it is at the lowest position if it is in contact with the ground but it is at a position higher than the lowest position (any of the positions of the other tires) if it is not in contact with the ground. Initially, the counting is performed assuming that the tire (1) is in contact with the ground, but if the tire (1) is not in contact with the ground, then the positions in the height direction of the tire (2) and other subsequent tires is further lower than the position of the tire (1), so that at this stage the number of axles is again set to "1."

Figure 16A:
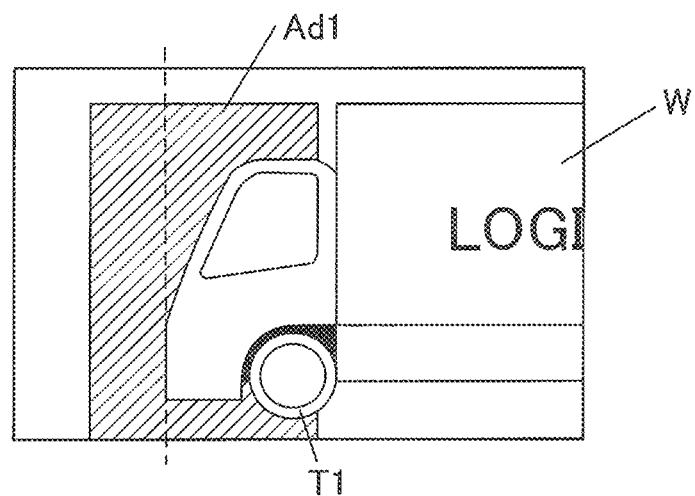
FIG. 16A is a diagram illustrating a modified example of a detection range of front-end and rear-end sections of a vehicle.
Figure 16B:
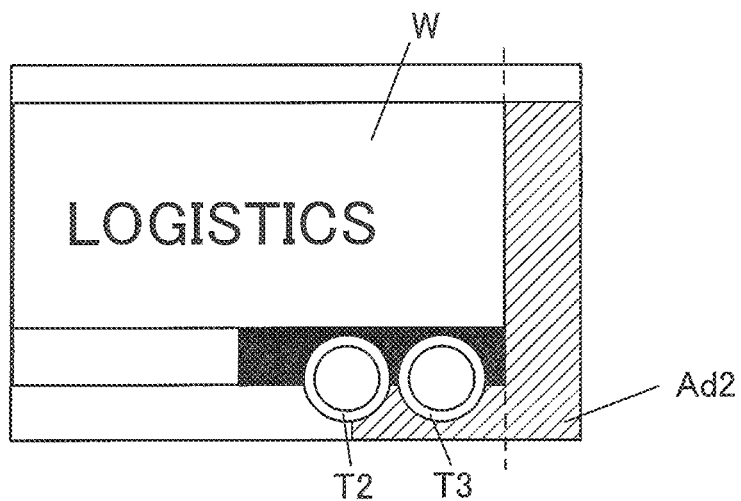
FIG. 16B is a diagram illustrating the modified example of the detection range of the front-end and rear-end sections of the vehicle.

FIG. 16A and FIG. 16B is a diagram that illustrates a modified example of the detection range of the front-end and rear-end sections of the vehicle.

The detection range Ad1 (FIG. 16A) in the case where the front-end section of the vehicle is to be detected and the detection range Ad2 (FIG. 16B) in the case where the rear-end section of the vehicle is to be detected may be able to be modified and set to positions of different imaging ranges. When the position where the front-end section of the vehicle is to be detected is placed on the front side in the traveling direction of the vehicle W, the range of the vehicle W included in the image in which the front-end section of the vehicle W has been detected is enlarged. Specifically, as illustrated in FIG. 4A and FIG. 4B, a situation is prevented where the image in which the front-end section has been detected is not used in generation of the panoramic photograph. Also, since many portions of the vehicle W are included in the image in which the front-end section is detected and the image in which the rear-end section is detected, it is made possible to reduce the number of images to be used in generation of the panoramic photograph.

Figure 17:
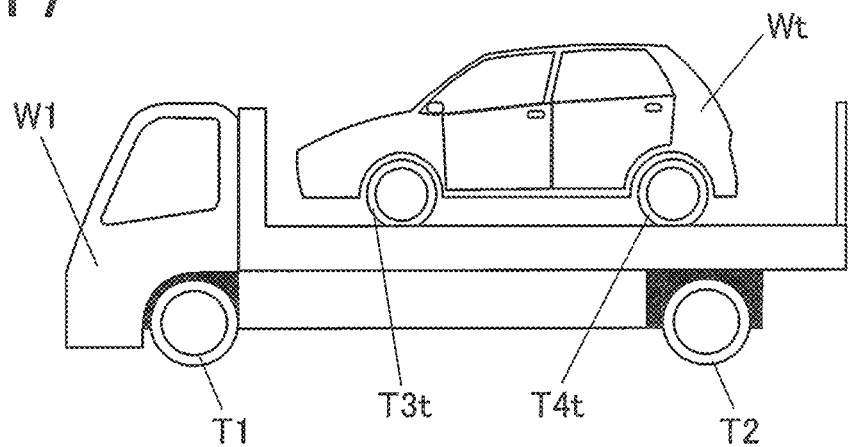
FIG. 17 is a diagram illustrating another example of a panoramic photograph generated for detection of the vehicle.

FIG. 17 is a diagram that illustrates another example of the panoramic photograph generated for detection of the vehicle.

Here, the vehicle W1 conveys the vehicle Wt. As a result of this, tires T3t and T4t of the vehicle Wt that is being conveyed are also detected in addition to the tires T1 and T2 of the vehicle W1. At this point, it is determined that the tire T4t is not a tire of the vehicle W1 by specifying the positional relationship between the tires T1, T2, T3t, and T4t in the horizontal direction. The tires T3t and T4t reside at substantially the same position in the height direction and have the same diameters, so that it is also determined that the tire T3t is not a tire of the vehicle W1.

In the foregoing, determination is performed on whether or not each tire is in contact with the ground and the tire that is not in contact with the ground is excluded from the counting of the number of axles. Meanwhile, in a case where the number of axles that are not in contact with the ground is also to be counted, it is necessary to exclude tires other than those of the vehicle W as the target of counting in this manner. Such tires may include not only those of an automobile but also those of a motorcycle, etc. Also, even in a case where the number of axles of the tires not in contact with the ground is not to be counted, the number of axles of the tires in contact with the ground is more reliably counted through such determination.

As has been described in the foregoing, the processing device 20 of this embodiment includes the controller 21. The controller 21, as an specifier, specifies the position of the tire T in the captured image that includes at least the tire T of the traveling vehicle, and, as a determination unit, determines whether or not the tire T is in contact with the ground on the basis of the specified position of the tire T, and, as a number-of-axles counter, counts the number of axles of the tires T determined as being in contact with the ground in each vehicle in accordance with the result of the determination.

In this manner, by determining whether or not the tire T is in contact with the ground using two-dimensional images and performing counting of the number of axles (whose tires are) in contact with the ground, the necessary number of axles can be acquired readily and quickly in a case where counting of the number of axles taking into account the contact with the ground is necessitated, for example, like a toll for passage of a toll road.

Also, the controller 21, as a determination unit, determines whether or not the multiple tires T are in contact with the ground by comparison between average position in the height direction of the predetermined parts (lower end positions, etc.) in the multiple tires T that have been specified by the controller 21 functioning as an specifier and the position in the height direction of the predetermined part of each of the tires T. In the case where the tire T is brought into or taken out of contact with the ground by a lift axle, by computing an average of the height positions of all the tires T, the height of the tire T that is in contact with the ground becomes lower than the average value, and the height of the tire T taken out of the contact becomes higher than the average. Hence, it is made possible to readily determine whether or not all the tire T is in contact with the ground.

In addition, the controller 21, when functioning as a determination unit, may determine that the tire T is not in contact with the ground if the position in the height direction of the predetermined parts (lower end positions, etc.) in each of the tires T that have been determined by the controller 21 functioning as an specifier is higher than that of any one of the other tires T. Specifically, in a case where the tire T is either in contact with or out of contact with the ground, then the height position of the tire T in contact with the ground is lowest. Hence, it is also possible to simply determine that the tires T other than the tire T at the lowest position are not in contact with the ground. By virtue of this, whether or not the tires T are in contact with the ground can be determined sequentially even when all the tires T have not yet been specified to determine the average value.

Further, the predetermined part is the lower end of the tire T. By specifying the lower end position that is actually in contact with the ground, it is made possible to readily and appropriately determine whether or not the tire T is in contact with the ground.

Also, the level of the predetermined part is computed on the basis of multiple points on the outer edge of the tire T. It may also be computed on the basis of a position appropriate for determining whether or not a tire is in contact with the ground, for example, surrounding points in a case where the rotation axis position of the tire or the like cannot be directly specified. By such processing as well, whether or not the tire T is in contact with the ground can be determined appropriately with the same or similar precision. Also, since there is some degree of freedom in the points on the outer edge of the tire T, even in a case where the specific position cannot be seen due to dirt of the tire T or the like, it is made possible to specify the predetermined part flexibly and reliably. Also, in particular, even in a case where one vehicle has multiple types of the tires T in terms of their sizes, whether or not the tire T is in contact with the ground can be determined readily and directly regardless of the varying sizes of the tires.

In addition, the level of the predetermined part may be computed on the basis of multiple points on the outer edge of the rim TR to which the tire T is attached. Since the outer edge of the rim TR is less susceptible to direct attachment of dirt and deformation due to load during travel of the vehicle, in a case where the specific position of the tire T cannot be seen directly or in a case where it cannot be specified, the predetermined part can be specified flexibly and accurately.

Further, the predetermined part may be the rotation axis of the tire T. Since the axle of the tire T is raised and lowered, so that the position of the axle, i.e., the change in the rotation axis position can be directly acquired.

Also, the predetermined part may be an upper end of the tire T. It is less likely that the upper end position cannot be specified depending on the road surface conditions than the lower end position, and it can be relatively readily specified as its height position resides at the highest location of the outer edge of the tire T. Hence, the upper position is less susceptible to the influence of the external environment and the conditions of the tire at the time of the imaging, so that whether or not the tire T is in contact with the ground can be more stably and readily determined.

In addition, the predetermined part may be a point on the outer edge of the rim TR to which the tire T is attached. It is less likely that dirt is directly attached to the outer edge of the rim TR during travel of the vehicle and it is not deformed due to load during travel of the vehicle. Hence, it is less susceptible to the influence of the external environment and the conditions of the tire at the time of the imaging, so that whether or not the tire T is in contact with the ground can be more stably and readily determined.

Further, the point on the outer edge of the rim TR may be a lower end position of the rim TR. When the diameters of all the tires T are equal to each other, the positional relationship of the lower end position of the rim TR may be used in the same manner as the lower end position of the tire T and thereby the determination of whether or not the tire T associated with the rim TR is in contact with the ground can be performed.

Also, when the predetermined part is not the lower end of the tire T, the controller 21, when functioning as the determination unit, in a case where at least any one of the sizes of the multiple tires T is different from those of the other ones, corrects the level of the predetermined part according to the difference in the sizes to the position corresponding to the size of the tire serving as the reference. By virtue of this, whether or not the respective tires T are in contact with the ground can be readily and appropriately determined through comparison between the various predetermined parts.

In addition, the controller 21, when functioning as the determination unit, determines whether or not the tire T is in contact with the ground by presence or absence of deformation in the tire T at the lower end position of the tire T. When the tire T is in contact with the ground, the tire T is deformed according to the load of the vehicle body. Specifically, the lower end of the tire T is imaged on a line extending in the horizontal direction. As a result, whether or not the tire T is in contact with the ground can be readily determined without comparing the position of the tire T with the positions of the other tires T.

Further, the controller 21, when functioning as the determination unit, specifies the vertical width in the height direction of the tire T and the horizontal width in the horizontal direction, and determines whether or not the tire T is in contact with the ground on the basis of the difference between the two specified widths (vertical width and horizontal width). Specifically, even in a case where it is difficult to determine whether or not the lower end of the tire T has a linear shape, it is possible to determine whether or not the tire T is deformed as long as it is possible to specify the fact that the vertical width (the difference in the height direction between the upper end position and any position of the portion in contact with the road surface) is shorter than the horizontal width. In this manner, it is made possible to readily and appropriately determine whether or not the tire T is in contact with the ground without performing the determination of the shape of the portion in contact with the ground.

Also, the controller 21, when functioning as the determination unit, may determine whether or not the tire T is in contact with the ground by determining presence or absence of rotation of the tire T on the basis of the multiple captured images at different time points. The tire T is rotated when it is in contact with the ground and is maintained in a no-rotation state according to the travel of the vehicle if it is in contact with the ground, so that the presence or absence of the rotation can be determined by using the multiple (multiple frames) images consecutively captured during the travel of the vehicle. Since the rotation of the tire T can be determined by the shape of the wheel TW, its design, change in the position of a marker provided on the tire T, the rim TR, or the like, etc., it is made possible to readily and appropriately indirectly determine whether or not the tire T is in contact with the ground without performing specification of the position in the height direction of the tire T and the linear shape.

In addition, the controller 21, when functioning as the determination unit, computes the positional relationship in the horizontal direction between the multiple tires that have been specified by the controller 21 functioning as the specifier, and excludes any object that is not a tire of the vehicle as the target of the determination on the basis of the positional relationship. Specifically, in some cases, tires of another vehicle placed on a loading platform may overlap the position of the tire of the vehicle as the target t of determination or multiple tires may be detected at unusually differing positions in the height direction. Based on these facts, the tires of the vehicle as the target of the determination is distinguished from tires of other vehicles to extract only the tires of the vehicle as the target of the determination and thus the counting of the number of axles can be accurately performed.

Further, the controller 21, when functioning as the image generator, overlays images such as multiple frames captured at different time points on top of each other and generates, as a captured image, a panoramic photograph that includes all the tires on at least one side of the vehicle.

As optical distortion is likely to occur at an edge of the field of view in a wide-angle lens, such distortion can be reduced by restricting the angle of view of the lens to a moderate one and the positional relationship and the size of the captured image can be used on an as-is basis as those that correspond to the actual positional relationship and the actual size. In this case, in the case of a heavy-duty vehicle or the like, it may be difficult to cover the entire vehicle by one single captured image. In view of this, by superposing images captured at different time points and each including a part of the vehicle on top of each other, the panoramic photograph can be synthesized (generated) which includes the entire tires of the vehicle as the target of the determination as a whole. By setting the positioning such that such a panoramic photograph is generated or can be generated, the process of determining the relative positional relationship between the tires of the vehicle can be readily performed. As a result, it is made possible to appropriately determine whether or not the tire T is in contact with the ground.

Also, the controller 21, when functioning as the image generator, uses some of the captured images captured at predetermined intervals to generate the panoramic photograph. Imaging of the traveling vehicle practically can be continuous capturing by capturing of a moving image. When all of these images (frame images) are used in the generation of the panoramic photograph, they contains many overlapping portions causing increase in time and labor, so that they may be interpolated as appropriate to be selected at appropriate intervals and superposed on top of each other, thereby wasteful processes are eliminated, and a panoramic photograph can be generated which includes all the tires T of the vehicle.

In addition, the controller 21, when functioning as the vehicle detector, detects the vehicle on the basis of the comparison between the captured image and the background image in which the background according to the given angle of view of the captured image is captured. Specifically, by capturing in advance the background image and extracting portions different from the background image, the image of the vehicle that appears in the background can be extracted. Hence, the time and labor associated with the detection of the vehicle can be reduced and the detection accuracy can be increased.

Further, the controller 21, when functioning as the vehicle detector, weights the difference between the captured image and the background image on a per-pixel basis according to a predetermined condition, and detects the vehicle on the basis of the weighted difference. In the case of imaging outdoors or the like, the background image also changes slightly depending on environment conditions such as sunlight, so that it is not easy to simply extract only the vehicle. In some cases, the difference in the background portion between the background image and the captured image may exhibit a feature according to the environment conditions, so that by performing weighting according to such a feature, the portion of the vehicle can be more appropriately extracted and its profile can be specified.

Also, the controller 21, when functioning as vehicle range specifier, specifies the range of a vehicle from the captured image, and, acting as the number-of-axles counter, counts the number of axles of the tires in contact with the ground within the specified range.

In this manner, by performing the counting of the number of axles of the tires within the vehicle range specified based on the captured image while determining the presence or absence of the contact with the ground, it is made possible to obtain the number of axles of the tires in contact with the ground appropriately for each vehicle.

Also, the controller 21, when functioning as the boundary detector, detects the front end and the rear end of the vehicle within the partial range defined for the captured image. On the travel route of the vehicle, various types of vehicles travel and their intervals vary depending on their traveling speeds. Accordingly, in some cases, portions of multiple vehicles may appear in one single image. Meanwhile, it may happen that a leading vehicle tows a following vehicle to travel in an integral manner. Specifically, it is necessary to correctly separate the leading and following vehicles from each other. The detection range Ad of the front-end section and the rear-end section of the vehicle is defined as a narrower range than the imaging range in advance, detection of the vehicle is performed within the detection range Ad, and thereby it is made possible to more reliably detect the fact that there is no connector between the leading and following vehicles, and accurately specify the range of the vehicle. By virtue of this, it is possible to prevent errors in the charging of the tolls on the vehicles in a toll road or the like. In particular, in a sensor using a laser beam or the like, failure to detect a thin corrector C or the like is likely to occur. In the processing device 20 of this embodiment, since the presence or absence of the corrector C within the detection range is determined using a two-dimensional image, such failure of detection is prevented, and the range of the vehicle can be reliably established.

In addition, the controller 21, when functioning as the boundary detector, is capable of changing the setting of the detection range Ad. On the travel route of the vehicle, the travel speeds of the vehicles and the intervals between preceding and following vehicles and the like change depending on the congestion situation or the like. Hence, by configuring the detection range Ad as a variable range, it is made possible to appropriately perform specification of the vehicle and detection of the tires T of the vehicle depending on the road conditions.

Further, the controller 21, when functioning as the boundary detector, changes the setting of the detection ranges Ad1, Ad2 differently between a case where the vehicle's front-end section should be detected and a case where the vehicle rear-end section should be detected. As described above, the efficiency of the processing will be higher when more tires are included in one captured image, so that it is made possible to detect all the tires T of each vehicle efficiently using a small number of images and perform the determination and comparison associated with the presence and absence of their contact with the ground by placing the detection range Ad1 for detecting the front-end section on the front side in the direction of travel of the vehicle and placing the detection range Ad2 for detecting the rear-end section on the side from which the vehicle enters.

Also, the controller 21, when functioning as the specifier, acquires the multiple captured images obtained by imaging from different directions and specifies the positions of the tires T by selecting and using any one of the captured images. In particular, in the imaging of vehicles outdoors, the accuracy of imaging of the vehicles may vary depending on direction of incidence of sunlight, the direction of raindrops, etc. By performing multiple rounds of imaging from different directions and selecting a captured image that ensures more appropriate imaging accuracy, it is made possible to more accurately perform the specification of the tires T and the determination of whether or not the tires T are in contact with the ground.

In addition, the controller 21, when functioning as the specifier, performs selection of the captured image according to the surrounding environment condition. Specifically, by selecting and using a captured image that allows the state of the tire T to be more appropriately obtained, it is made possible to perform processing associated with detection of the tire T and specification of their positions and prevent errors in the detection or the like.

Further, the surrounding environment conditions may include the direction of incidence of sunlight. The amount of incident light, which varies depending on chronologically changing direction of incidence of sunlight, seasons, clouds, and other conditions, affects the difference relative to the background image when the difference is extracted. Hence, the processing device 20 more readily and appropriately detects the tire T while excluding their influences to the extent possible, which makes it possible to determine the presence or absence of their contact with the ground.

Also, the controller 21, when functioning as the specifier, performs selection of the captured image after having performed image processing for reducing the noise in accordance with the environment conditions. In some cases, the influences of dusts and the like due to raindrops and wind can be reduced by image processing, so that by performing the selection of the image after having performed such image processing, it is made possible to finally select the more preferable image and more reliably perform detection of the tire T and the determination of presence or absence of contact with the ground.

In addition, the number-of-axles detection system 1 of this embodiment includes the above-described processing device 20 and the imaging unit 11 that performs imaging of the captured image. According to this number-of-axles detection system 1, on the basis of the two-dimensional image captured by the imaging unit 11, it is made possible to readily and appropriately detect the traveling vehicles such that they can be separated from each other, determine whether or not the tires T of the vehicle are respectively in contact with the ground, and count the number of axles of the tires T taking into account whether or not they are in contact with the ground. By virtue of this, it is made possible to accurately perform setting of the tolls of the toll road taking into account the presence or absence of contact with the ground of the tires T.

Further, according to the processing device 20 of this embodiment, the controller 21, when functioning as the determination unit, sets the toll for entry (toll for traveling) to enter a predetermined section of entry such as a toll road by the vehicle on the basis of the number of axles counted by the number-of-axles counter.

In this manner, the number of axles in contact with the ground can be readily and appropriately counted, the tolls can be defined on the basis of the number of axles, and thereby it is made possible to prevent erroneous collection of tolls or omission of collection, omission of charging, and the like due to erroneous determination on the number of axles.

Also, according to the number-of-axles detection system 1 of this embodiment, since the processing device 20, when functioning as a toll setting system, sets the toll for traveling on the basis of the captured image by the imaging unit 11, the number of axles in contact with the ground is readily and appropriately counted, and the tolls are defined accurately on the basis of the number of axles. Hence, it is made possible to prevent erroneous collection of tolls or omission of collection, omission of charging, and the like.

In addition, the program 221 of this embodiment causes a computer to specify a position of tires T of a moving vehicle from a captured image showing at least the tire T; make a determination of whether or not each of the tires T is in contact with a ground on the basis of a position of the tires T specified by the specifier; and count the number of axles of the tire in contact with the ground of the vehicle according to a result of the determination made by the determination unit. In this manner, since the program 221 causes, in a software-like manner, the controller 21 (CPU 211) to perform the counting of the number of axles on the basis of the image of the traveling vehicle, it is made possible to acquire the number of axles of the tires T in contact with the ground readily and appropriately without the need of a special configuration.

It should be noted that the present invention is not limited to the above-described embodiment and various modifications may be made thereto.

For example, in the above-described embodiment, descriptions have been provided assuming that the imaging of the vehicle takes place horizontally starting from the side, but it may be performed by another angle. In that case, the captured image should be subjected to coordinate conversion as appropriate and the distance from the ground should be computed.

Also, in the above-described embodiment, the rotation axis position of the tire T is computed from multiple points on the outer edge of the tire T or computed from multiple points on the outer edge of the rim TR, but it may be directly specified if it can be directly specified at all. Also, a point on the outer edge of the tire T and a point on the outer edge of the rim TR may be used in combination to compute the rotation axis position.

In addition, in the above-described embodiment, the sizes of the tires T are actually measured, but, in a case where the types of the vehicles can be identified, on the basis of a database of the vehicles, information on the sizes of the tires T attached to the vehicle may be acquired and used.

Further, in the above-described embodiment, descriptions have been provided based on the example where the difference from the average position of the tire T and the presence or absence of the deformation of the lower end or presence or absence of rotation of the tire are used in combination to determine the presence or absence of contact with the ground, but whether or not the tire T is in contact with the ground may be determined based on any one of them. The selection and use of any one of these methods and the method of determining the sequentially determining whether or not the distances in the vertical widths and horizontal widths of the tires and determining whether or not each tire T is at the lowest position in the height direction, the lowest position, may be changed as appropriate depending on whether or not the lower end position can be seen or may be fixed to the method that does not use the lower end position.

Also, in the above-described embodiment, the panoramic photograph is generated using multiple images, but the panoramic photograph may not be actually generated and a group of captured images enabling generation may be simply defined. Also, detection of the tire T and determination of presence or absence of contact with the ground may be performed on each captured image on an as-is basis without defining captured images as a panoramic photograph as long as it is possible to specify overlapping portions in multiple images and detect the front-end sections and the rear-end section of respective vehicles. Also, with regard to a small vehicle or the like that can be covered by one single captured image without the need of generation of a panoramic photograph, it may be made possible to perform these processes on the one single captured image on an as-is basis.

In addition, detection of the vehicle's front-end section and rear-end section does not need to be always performed within the detection range Ad as a part of the imaging range of the captured image. The front-end section and the rear-end section may be detected in accordance with the detection of the profile of the vehicle across the entire imaging range. Also, the detection range Ad1 of the front-end section and the detection range Ad2 of the rear-end section may be identical with each other.

Further, in the above-described embodiment, detection of the profile of the vehicle is performed on the basis of the difference from the background image, but such a process may not be performed. In addition, a difference from images captured at preceding and following time points may be used.

Also, in the above-described embodiment, descriptions have been provided based on the example of counting of tolls for a vehicle to enter a toll road or the like, but it may also be used in detection of a vehicle entering a pay parking lot. Also, the counting of the number of axles by the processing device 20 is not limited to the purpose of toll decision but may be used for a gate that controls entry of vehicles.

In addition, the processing device 20 may be connected to an appropriate external imaging device and configured to acquire and process an image of the imaging device. Also, the processing associated with counting of the number of axles by the processing device 20 is not limited to the one that is performed on a real time basis. For example, it may be used to subsequently process captured images that are captured in a predetermined period of time collectively for the purpose of counting and measurement of amounts of traffic by vehicle types or any other relevant purposes.

Further, in the above description, the storage 22 including non-volatile memory has been described as an example of the computer-readable medium that stores the program 221 related to the processing operation of the controller 21 according to the present invention, but the present invention is not limited to this. As other computer readable recording media, it is possible to implement portable recording media such as a hard disk drive (HDD), a CD-ROM disc, a DVD disc, etc. In addition, a carrier wave may also be also implemented on the present invention as a medium that provides the data of the program according to the present invention via a communication line.

Other specific details described in the above embodiments such as configurations, processing and procedures can be modified as required without departing from the gist of the present invention.

Although embodiments of the present invention have been described and illustrated in detail, the disclosed embodiments are made for the purposes of illustration and example only and not limitation. The scope of the present invention should be interpreted by terms of the appended claims.

The entire disclosure of Japanese Patent Application No. 2018-163491, filed on Aug. 31, 2018, is incorporated herein by reference in its entirety.

What is claimed is:

1. An image processing device comprising a hardware processor that:
specifies a position of a plurality of tires of a moving vehicle from a captured image showing at least one of the plurality of tires of the vehicle;
makes a determination of whether or not each of the plurality of tires is in contact with a ground on a basis of a position of the specified plurality of tires; and
counts the number of axle of a tire in contact with the ground of the vehicle according to a result of the determination,
wherein in the determination, the hardware processor determines whether or not each of the specified plurality of tires is in contact with the ground through comparison between an average level of predetermined parts of the plurality of tires and a level of a predetermined part of each of the plurality of tires.

2. The image processing device according to claim 1, wherein the predetermined part is a lower end of the tire.

3. The image processing device according to claim 1, wherein the level of the predetermined part is calculated on a basis of multiple points on an outer edge of each of the plurality of tires.

4. The image processing device according to claim 3, wherein, when at least one of the plurality of tires has a difference dimension from the other of the plurality of tires, the hardware processor corrects the level of the predetermined part according to dimensional difference between the plurality of tires.

5. The image processing device according to claim 1, wherein the level of the predetermined part is calculated on a basis of multiple points on an outer edge of a rim to which each of the plurality of tires is attached.

6. The image processing device according to claim 1, wherein the predetermined part is a rotation axis of the tire.

7. The image processing device according to claim 1, wherein the predetermined part is an upper end of each of the plurality of tires.

8. The image processing device according to claim 1, wherein the predetermined part is a point on an outer edge of a rim to which each of the plurality of tires is attached.

9. The image processing device according to claim 8, wherein the point on the outer edge of the rim is a lower end of the rim.

10. The image processing device according to claim 1, wherein in the determination, the hardware processor determines whether or not each of the plurality of tires is in contact with the ground on a basis of deformation of each of the plurality of tires at a lower end.

11. The image processing device according to claim 1, wherein in the determination, the hardware processor specifies a width in a height direction and a width in a horizontal direction of the plurality of tires and determines whether or not each of the plurality of tires is in contact with the ground on a basis of a difference between the two specified widths.

12. The image processing device according to claim 1, wherein in the determination, the hardware processor determines whether or not each of the plurality of tires is in contact with the ground by determining rotation of the plurality of tires on a basis of a plurality of images captured at different time points.

13. The image processing device according to claim 1, wherein in the determination, the hardware processor calculates a positional relationship in a horizontal direction of the specified plurality of tires and excludes any object that is not a tire of the vehicle from the determination on a basis of the positional relationship.

14. The image processing device according to claim 1, wherein the hardware processor overlays a plurality of images that are captured at different time points and generates, as the captured image, a panoramic photograph including all tires at least one side of the vehicle.

15. The image processing device according to claim 14, wherein the hardware processor generates the panoramic photograph by using some of the captured plurality of images that is captured at predetermined time intervals.

16. The image processing device according to claim 1, wherein the hardware processor detects the vehicle on a basis of comparison between a background image and the captured image, wherein the background image has a same angle of view as the captured image.

17. The image processing device according to claim 16, wherein the hardware processor weights a difference between the captured image and the background image, the difference being weighted with respect to each pixel according to a predetermined condition, and detects the vehicle on a basis of the weighted difference.

18. The image processing device according to claim 1, wherein the hardware processor specifies a range of each vehicle from the captured image, and counts the number of axle of the tire in contact with the ground with respect to each specified range.

19. The image processing device according to claim 18, wherein in specifying the range of each vehicle, the hardware processor detects a front end and a rear end of the vehicle within a predetermined area of the captured image.

20. The image processing device according to claim 19, wherein in detecting the front end and the rear end of the vehicle, the hardware processor changes the predetermined area of the captured image.

21. The image processing device according to claim 19, wherein the hardware processor changes the predetermined area between when detecting the front end of the vehicle and when detecting the rear end of the vehicle.

22. The image processing device according to claim 1, wherein the hardware processor obtains a plurality of captured images captured from different directions and selectively uses one of the plurality of captured images as the captured image to specify the position of the plurality of tires.

23. The image processing device according to claim 22, wherein the hardware processor selects one of the plurality of captured images according to a surrounding environment condition.

24. The image processing device according to claim 23, wherein the surrounding environment condition includes a direction of sunlight.

25. The image processing device according to claim 23, wherein the hardware processor selects one of the plurality of captured images after reducing noise by performing image processing on the plurality of captured images according to the environment condition.

26. A number-of-axles detection system comprising:
the image processing device according to claim 1; and
an imaging unit that captures the captured image.

27. A toll setting device comprising the image processing device according to claim 1, wherein the hardware processor sets a toll for entry of the vehicle into a predetermined section on a basis of the counted number of axle.

28. A toll setting system comprising:
the toll setting device according to claim 27; and
an imaging unit that captures the captured image.

29. An image processing device comprising a hardware processor that:
specifies a position of a plurality of tires of a moving vehicle from a captured image showing at least one of the plurality of tires of the vehicle;
makes a determination of whether or not each of the plurality of tires is in contact with a ground on a basis of a position of the specified plurality of tires; and
counts the number of axle of a tire in contact with the ground of the vehicle according to a result of the determination, wherein in response to the level of the predetermined part of one of the plurality of tires being higher than the level of the predetermined part of the other tire of the plurality of tires, the hardware processor determines that the one of the plurality of tires is not in contact with the ground.

30. A non-transitory computer-readable medium storing a program that causes a computer to:
specify a position of a plurality of tires of a moving vehicle from a captured image showing at least the plurality of tires;
make a determination of whether or not each tire is in contact with a ground on a basis of a position of the plurality of tires specified by the specifier; and
count the number of axle of a tire in contact with the ground of the vehicle according to a result of the determination,
wherein in the determination, the computer determines whether or not each of the specified plurality of tires is in contact with the ground through comparison between an average level of predetermined parts of the plurality of tires and a level of a predetermined part of each of the plurality of tires.

* * * * *